United States Patent
Zhang et al.

(10) Patent No.: US 11,868,131 B2
(45) Date of Patent: Jan. 9, 2024

(54) FLIGHT PATH DETERMINATION

(71) Applicant: SZ DJI TECHNOLOGY CO., LTD., Shenzhen (CN)

(72) Inventors: Litian Zhang, Shenzhen (CN); Xiao Hu, Shenzhen (CN); Ang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/929,832

(22) Filed: Sep. 6, 2022

(65) Prior Publication Data

US 2023/0195112 A1    Jun. 22, 2023

Related U.S. Application Data

(63) Continuation of application No. 16/406,887, filed on May 8, 2019, now abandoned, which is a continuation
(Continued)

(51) Int. Cl.
*G05D 1/00*      (2006.01)
*B64C 39/02*    (2023.01)
(Continued)

(52) U.S. Cl.
CPC .......... *G05D 1/0088* (2013.01); *B64C 39/024* (2013.01); *G01C 21/20* (2013.01);
(Continued)

(58) Field of Classification Search
CPC .. G05D 1/0088; G05D 1/0005; G05D 1/0061; G05D 1/0022; B64C 39/024;
(Continued)

(56) References Cited

U.S. PATENT DOCUMENTS

| 4,078,749 A | 3/1978 | Johnson |
| 4,812,990 A | 3/1989 | Adams et al. |

(Continued)

FOREIGN PATENT DOCUMENTS

| CN | 101228490 A | 7/2008 |
| CN | 101259331 A | 9/2008 |

(Continued)

OTHER PUBLICATIONS

Walter Johnson et al. "Management of Continuous Descent Approach During Interval Management Operation", 29th Digital Avionics Systems Conference, Oct. 3-7, 2010.
(Continued)

*Primary Examiner* — Behrang Badii
*Assistant Examiner* — Jay Khandpur
(74) *Attorney, Agent, or Firm* — Anova Law Group, PLLC

(57) ABSTRACT

A method of determining a flight path for an aerial vehicle, includes controlling the aerial vehicle to fly along a first route, identifying, during the flight along the first route and with aid of one or more processors, a change in a state of signal transmission occurring at a first location, in response to identifying the change, determining, by the one or more processors, a second location different from the first location, determining a second route to the second location, and controlling, by the one or more processors, the aerial vehicle to fly to and land at the second location. The change of the state of signal transmission indicates an abnormal state in a signal transmission between the aerial vehicle and a control device.

20 Claims, 13 Drawing Sheets

Related U.S. Application Data of application No. PCT/CN2016/105804, filed on Nov. 14, 2016.

(51) Int. Cl.
*G01C 21/20* (2006.01)
*B64U 10/13* (2023.01)
*B64U 30/20* (2023.01)

(52) U.S. Cl.
CPC ......... *G05D 1/0005* (2013.01); *G05D 1/0061* (2013.01); *B64U 10/13* (2023.01); *B64U 30/20* (2023.01); *B64U 2201/10* (2023.01); *B64U 2201/20* (2023.01); *G05D 1/0022* (2013.01)

(58) Field of Classification Search
CPC .... G01C 21/20; B64U 2201/10; B64U 10/13; B64U 2201/20; B64U 30/20
See application file for complete search history.

(56) References Cited

U.S. PATENT DOCUMENTS

| | | | |
|---|---|---|---|
| 9,817,396 | B1 | 11/2017 | Takayama et al. |
| 2004/0093299 | A1* | 5/2004 | Bodin .................. G06Q 40/04 705/37 |
| 2009/0121932 | A1 | 5/2009 | Whitehead et al. |
| 2010/0094485 | A1 | 4/2010 | Verlut et al. |
| 2010/0131121 | A1 | 5/2010 | Gerlock |
| 2010/0250022 | A1 | 9/2010 | Hines et al. |
| 2010/0292874 | A1 | 11/2010 | Duggan et al. |
| 2013/0204470 | A1 | 8/2013 | Luckner et al. |
| 2014/0142787 | A1 | 5/2014 | Tillotson |
| 2015/0197010 | A1 | 7/2015 | Ruuspakka et al. |
| 2015/0336668 | A1 | 11/2015 | Pasko et al. |
| 2016/0016663 | A1* | 1/2016 | Stanek ................ G05D 1/0202 701/3 |
| 2016/0117932 | A1 | 4/2016 | Park et al. |
| 2016/0157075 | A1* | 6/2016 | Ho .................... H04W 56/0015 455/404.1 |
| 2016/0275801 | A1* | 9/2016 | Kopardekar ......... G08G 5/0082 |
| 2016/0299231 | A1 | 10/2016 | Bianchi et al. |
| 2016/0328980 | A1* | 11/2016 | Sharma ............... G08G 5/0056 |
| 2016/0370807 | A1 | 12/2016 | Gilmore et al. |
| 2016/0371985 | A1* | 12/2016 | Kotecha ............... G06Q 10/047 |
| 2017/0029107 | A1* | 2/2017 | Emami ................ G08G 5/0069 |
| 2018/0120829 | A1 | 5/2018 | Price et al. |
| 2018/0262674 | A1* | 9/2018 | Iwakura ............... H04N 17/002 |
| 2018/0292214 | A1* | 10/2018 | Zhang .................. G05D 1/106 |
| 2019/0144116 | A1 | 5/2019 | Yuan |
| 2019/0250643 | A1* | 8/2019 | Takizawa ............... B64C 39/02 |

FOREIGN PATENT DOCUMENTS

| | | |
|---|---|---|
| CN | 102067053 A | 5/2011 |
| CN | 102362141 A | 2/2012 |
| CN | 102955478 A | 3/2013 |
| CN | 103051373 A | 4/2013 |
| CN | 103809597 A | 5/2014 |
| CN | 104062979 A | 9/2014 |
| CN | 104797995 A | 7/2015 |
| CN | 104932526 A | 9/2015 |
| CN | 204631621 U | 9/2015 |
| CN | 105185163 A | 12/2015 |
| CN | 105356930 A | 2/2016 |
| CN | 105554841 A | 5/2016 |
| CN | 105573339 A | 5/2016 |
| CN | 105759839 A | 7/2016 |
| CN | 105824320 A | 8/2016 |
| CN | 105824324 A | 8/2016 |
| CN | 105867368 A | 8/2016 |
| CN | 105940627 A | 9/2016 |
| EP | 1868008 A1 | 12/2007 |
| KR | 20160073473 A | 6/2016 |
| RU | 2466355 C1 | 11/2012 |
| WO | 2015067374 A1 | 5/2015 |

OTHER PUBLICATIONS

Lei Zhu et al. "Research on Urban Application-oriented Route Planning of UAV Based on Mobile Communication Network", 2015 4th International Conference on Computer Science and Network Technology (ICCSNT), 2015.

Zhong Dong et al. "A Network Topology Control Mechanism Based on Air Vehicle Movement Characteristics", Journal of Northwestern Polytechnical University, vol. 33 No. 6, Dec. 2015.

Zeyu Dong, "Self adaptive guidance method for terminal energy management segment of reusable launch vehicle" Anhui Science & Technology, 2015.

World Intellectual Property Organization (WIPO) International Search Report and Written Opinion for PCT/CN2016/105804 dated Aug. 18, 2017 7 Pages.

Luca De Filippis et al: "A Minimum Risk Approach for Path Planning of UAVs", J. of Intelligent and Applications—(Incorporating Mechatronic Systems Engineering), Kluwer Academic Publishers, DO,vol. 61, No. 1-4, Nov. 12, 2010, p. 203-219.

Nathan Richards et al:"A Hybrid A*/Automaton Approach to On-Line Path Planing with Obstacle Avoidance", AIAA 1st Intelligent Systems Techical Conference, AIAA American Inst of Aeronautics and Astronautics US; Chicago, Illinois, USA, No. AIAA-2004-6229, Jan. 1, 2004, p. 141-157.

* cited by examiner

FLIGHT PATH DETERMINATION

CROSS-REFERENCE TO RELATED APPLICATIONS

This application is a continuation of U.S. patent application Ser. No. 16/406,887, filed on May 8, 2019, which is a continuation of International Application No. PCT/CN2016/105804, filed on Nov. 14, 2016, the entire contents of both of which are incorporated herein by reference.

BACKGROUND

Unmanned vehicles such as unmanned aerial vehicles (UAVs) can be used for performing surveillance, reconnaissance, and exploration tasks in a wide variety of environments for military and civilian applications. A UAV may be manually controlled by a remote user, or may operate in a semi-autonomous or fully autonomous manner. Such UAVs can include processors to automatically determine how its flight paths.

Existing approaches for determining flight paths with respect to specific objectives may be less than optimal in some instances. For example, the determination may not be sufficiently adaptive to changes of circumstances or tailored to properties of the flying regions.

SUMMARY

This application provides a system and related methods for determining flight paths within an air space for an aerial vehicle. The determination can be made based on various conditions, such as the conditions of the aerial vehicle, of the flight environment, of signal transmission between the aerial vehicle and a remote device, and so on. These conditions may generally determine in which regions of the air space a flight path may lie and in what manner a flight path may be built.

In some aspect, a method of determining a flight path for an aerial vehicle is provided. The method provides identifying during flight and with aid of one or more processors, a change in a state of signal transmission occurring at a first location; in response to the identifying, selecting a first destination within a proximity of a second location, wherein a state of signal transmission at the second location during a previous flight is different from a state of signal transmission at the first location; determining a first flight path to reach the first destination, wherein the first flight path comprises accessible locations detected by one or more sensors onboard one or more aerial vehicles; upon reaching the first destination by the aerial vehicle, assessing in real time a state of signal transmission at the first destination; and determining a second flight path to a second destination based on said assessment.

In some embodiments, the change in a state of signal transmission includes a loss or weakening of signal transmitted between the aerial vehicle and a remote device. In some embodiments, the signal transmitted includes data relating to control signals generated by the remote device for operating said aerial vehicle, or image data acquired by the aerial vehicle.

In some embodiments, the first destination is proximal to the second location such that it is within about 10 meters away from the second location. In some embodiments, the first destination is proximal to the second location such that signal transmission rates at the first location and the second location are both above a predetermined threshold. In some embodiments, the first destination is at the second location. In some embodiments, the change in a state of signal transmission includes a change in signal transmission rate between the aerial vehicle and a remote device. In some embodiments, the remote device is a remote controller or a satellite. In some embodiments, the change results in the signal transmission rate being below a predetermined threshold.

In some embodiments, the identifying includes receiving a notification from a sensor of the aerial vehicle or a remote device. In some embodiments, the first destination is selected based on a user input. In some embodiments, the change of a state of signal transmission indicates an abnormal state in a signal transmission between the aerial vehicle and a remote device. In some embodiments, the first destination is selected based on an operational status of the one or more sensors onboard the aerial vehicle. In some embodiments, the one or more sensors comprise one or more GPS receivers. In some embodiments, the first destination is selected based on current condition of a flight environment. In some embodiments, the current condition of a flight environment comprises weather condition or a wireless signal strength.

In some embodiments, the second location is a location detected by the one or more sensors onboard the one or more aerial vehicles during a previous flight. In some embodiments, the second location is a last point where signal transmission between the aerial vehicle and the remote device was successful. In some embodiments, the first destination is within a predetermined distance from the first location. In some embodiments, the predetermined distance is less than 10 meters.

In some embodiments, the first flight path is a reverse of a last flight path of the aerial vehicle. In some embodiments, the first flight path comprises no locations undetected by the one or more sensors during the previous flight. In some embodiments, the first location, first destination, second location, or the second destination is characterized by GPS coordinates. In some embodiments, the one or more sensors onboard the one or more aerial vehicles comprise one or more of a camera, a radar, a lidar, an ultrasonic sensor, and a GPS receiver. In some embodiments, the second destination is selected based on a user input from a remote device.

In some embodiments, the method further comprises, prior to or concurrent with selecting the second destination, hovering the aerial vehicle for a predetermined period of time to gather data in real time. In some embodiments, the second flight path is determined while the aerial vehicle is hovering. In some embodiments, when no user input is received within the predetermined period of time, the second destination is a starting point for a current flight. In some embodiments, when no user input is received within the predetermined period of time, selecting the second destination includes further hovering for a second predetermined period of time. In some embodiments, the second destination is a location undetected by the one or more sensors during the previous flight. In some embodiments, the second destination is a predetermined location for the aerial vehicle to reach before identifying the change in the state of signal transmission occurring at the first location.

In some embodiments, the method further comprises selecting the second destination based on real-time information. In some embodiments, the real-time information is related to one or more of the following: a user input, an operational status of the aerial vehicle, and a current condition of a flight environment. In some embodiments, the current condition of the flight environment includes a weather condition or a wireless signal strength. In some embodiments, the real-time information indicates an abnormal operational status of the aerial vehicle.

In some embodiments, the second destination is a starting point for current flight. In some embodiments, the second destination is a service point providing services to restore a normal operational status, and wherein the second flight path is determined based on a flying distance to the service point. In some embodiments, the abnormal operational status indicates a low fuel level or a low battery level. In some embodiments, the change in a state of signal transmission includes a loss or weakening of signal transmitted between the aerial vehicle and a remote device. In some embodiments, when the signal transmission remains lost or weakened at the first destination, determining the second flight path comprises including a location undetected by any of the one or more sensors of the one or more aerial vehicles during previous flight. In some embodiments, the second flight path includes a location detected by any of the one or more sensors of the one or more aerial vehicles during a previous flight, when the signal transmission remains lost or weakened at the first destination. In some embodiments, the second flight path includes a location undetected by any of the one or more sensors of the one or more aerial vehicles during a previous flight, when the state of signal transmission of the first destination returns to a normal state at the first destination.

In some embodiments, the method further comprises selecting a second flight path is further dependent on a user input from a remote device. In some embodiments, wherein the signal transmission includes transmitting image data acquired by an image device onboard the aerial vehicle. In some embodiments, the operational status of the aerial vehicle indicates that power level of a battery configured to power at least one or more propulsion units of the aerial vehicle falls below a threshold. In some embodiments, the power level is insufficient to power the aerial vehicle from the first destination to the second destination.

In another aspect, a system for determining a flight path for an aerial vehicle is provided. The system comprises one or more processors; and one or more memories having instructions stored thereon which when executed by the one or more processors cause the processor to perform: identifying during flight a change in a state of signal transmission occurring at a first location; in response to the identifying, selecting a first destination within a proximity of a second location, wherein a state of signal transmission at the second location during a previous flight is different from a state of signal transmission at the first location; determining a first flight path to reach the first destination, wherein the first flight path comprises accessible locations detected by one or more sensors onboard one or more aerial vehicles; upon reaching the first destination by the aerial vehicle, assessing in real time state of signal transmission at the first destination; and determining a second flight path to a second destination based on said assessment.

In another aspect, a non-transitory computer-readable storage medium with instructions stored thereon that, when executed by a computing system, cause the computing system to perform a method of determining a flight path for an aerial vehicle. The method comprises the method comprises identifying during flight a change in a state of signal transmission occurring at a first location; in response to the identifying, selecting a first destination within a proximity of a second location, wherein a state of signal transmission at the second location during a previous flight is different from a state of signal transmission at the first location; determining a first flight path to reach the first destination, wherein the first flight path comprises accessible locations detected by one or more sensors onboard one or more aerial vehicles; upon reaching the first destination by the aerial vehicle, assessing in real time state of signal transmission at the first destination; and determining a second flight path to a second destination based on said assessment.

In another aspect, a method of planning a flight path for an aerial vehicle is provided. The method comprises obtaining, with aid of one or more processors, (a) one or more costs each associated with a path segment connecting a first point and a second point, wherein the first point and the second point are in a search space of a plurality of points including a starting point and an end point, and (b) one or more costs each associated with an auxiliary segment connecting the second point and a target point, the target point includes a two-dimensional (2D) coordinate; applying an objective function to the second point, wherein the objective function yields an estimated cost for a route from the starting point through the second point to the end point, and wherein the objective function is based on a combination of two or more components, including at least one of the obtained one or more costs associated with the auxiliary segment; and including the path segment into the flight path that starts from the starting point and connects to one or more path segments in a sequence, when the applying of the objective function to the second point yields a desired value, thereby planning the flight path.

In some embodiments, the method further comprises repeating the steps of the obtaining, the applying and the including until the flight path includes the end point. In some embodiments, the desired value is a minimum of values yielded by applying the objective function to multiple candidate second points in the search space. In some embodiments, the two or more components further include one or more costs associated with a straight line connecting the second point and the end point.

In some embodiments, the method further comprises directing the aerial vehicle to follow the flight path. In some embodiments, the 2D coordinate for the target point is associated with a surface height with respect to a reference level for which an actual value is unknown to the aerial vehicle. In some embodiments, the target point is a nearest point to the second point.

In some embodiments, the cost associated with the auxiliary segment is related to a category of an object associated with the target point. In some embodiments, the cost associated with the auxiliary segment is related to a distance between the second point and the target point. In some embodiments, the cost associated with the auxiliary segment is related to an estimate of a surface height at the target point or a confidence indicator associated with the estimate. In some embodiments, the method further comprises assigning a weight to the cost associated with the auxiliary segment depending on the confidence indicator associated with the estimate in computing a value of the objective function.

In some embodiments, the cost associated with the path segment from the first point to the second point is related to a distance between the two points. In some embodiments, the cost associated with the path segment is further related to a difference between the heights of the two points when the height of the second point is greater than the height of the first point. In some embodiments, the method further comprises assigning a first weight to a distance between 2D coordinates corresponding to the two points and a second weight to a difference in the third dimension of the two points in computing a value of the cost associated with the path segment.

In some embodiments, the cost associated with the path segment is related to one or more of the following status indicators associated with the aerial vehicle: an aggregate battery level, an aggregate GPS signal strength, an aggregate ground control signal strength, and an aggregate image transmission rate over points on the path segment.

In some embodiments, the method further comprises determining a cost associated with a path segment connecting a preceding point of the first point and the second point that are along a line of sight. In some embodiments, the path segment connecting a preceding point of the first point and the second point is added to the flight path when the cost associated with the path segment connecting a preceding point of the first point and the second point is less than an aggregated cost associated with the path segment connecting the first point and the second point and a path segment connecting the preceding point of the first point and the first point. In some embodiments, the determining the cost associated with the path segment connecting a preceding point of the first point and the second point is performed only when the cost of the auxiliary segment from the second point to the target point is greater than a predetermined threshold. In some embodiments, the cost of the path segment connecting a preceding point of the first point and the second point is related to a distance from the preceding point of the first point to the second point. In some embodiments, the method further comprises determining if an obstacle is present in the path segment connecting a preceding point of the first point and the second point.

In some embodiments, the method further comprises, upon detecting a presence of a predetermined condition in real time, directing the aerial vehicle to follow a new flight path. In some embodiments, the predetermined condition is emergence of an unforeseen obstacle or loss of a signal.

In some embodiments, the end point is a previously visited point, a known safe point, a ground control center, or a user location.

In another aspect, a system for planning a flight path for an aerial vehicle is provided. The system comprises one or more processors; and one or more memories having instructions stored thereon which when executed by the processor cause the processor to perform: obtaining (a) one or more costs each associated with a path segment connecting a first point and a second point, wherein the first point and the second point are in a space of a plurality of points including a starting point and an end point, and (b) one or more costs each associated with an auxiliary segment connecting the second point and a target point, the target point includes a two-dimensional (2D) coordinate; applying an objective function to the second point, wherein the objective function yields an estimated cost for a route from the starting point through the second point to the end point, and wherein the objective function is based on a combination of two or more components, including at least one of the obtained one or more costs associated with the auxiliary segment; and including the path segment into the flight path that starts from the starting point and connects to one or more path segments in a sequence, when the applying of the objective function to the second point yields a desired value, thereby planning the flight path.

In another aspect, a non-transitory computer-readable storage medium with instructions stored thereon that, when executed by a computing system, cause the computing system to perform a method of planning a flight path for an aerial vehicle. The method comprises obtaining (a) one or more costs each associated with a path segment connecting a first point and a second point, wherein the first point and the second point are in a space of a plurality of points including a starting point and an end point, and (b) one or more costs each associated with an auxiliary segment connecting the second point and a target point, the target point includes a two-dimensional (2D) coordinate; applying an objective function to the second point, wherein the objective function yields an estimated cost for a route from the starting point through the second point to the end point, and wherein the objective function is based on a combination of two or more components, including at least one of the obtained one or more costs associated with the auxiliary segment; and including the path segment into the flight path that starts from the starting point and connects to one or more path segments in a sequence, when the applying of the objective function to the second point yields a desired value, thereby planning the flight path.

In yet another aspect, a method of planning a flight path for an aerial vehicle is provided. The method comprises identifying, with aid of one or more processors, a plurality of candidate points, wherein the plurality of candidate points are in a predetermined relationship with a first point; determining a cost associated with each candidate point of the plurality of candidate points, wherein the determining of the cost is at least based on a distance between each candidate point and a target point, wherein the target point is associated with a surface height with respect to a reference level; selecting one candidate point from the plurality candidate points, when the cost associated with the selected candidate point satisfies a predetermined condition; and including a segment connecting the first point and the selected candidate point into the flight path, thereby planning the flight path.

In some embodiments, the method further comprises taking the selected candidate point as the first point and repeating the steps of the identifying, the determining, the selecting and the including until the flight path reaches an end point. In some embodiments, the method further comprises directing the aerial vehicle to follow the flight path.

In some embodiments, the plurality of candidate points are within a predetermined distance relative to the first point. In some embodiments, the predetermined condition indicates a minimum of costs associated with the plurality of candidate points. In some embodiments, the determining of the cost is further based on a distance between each candidate point and the first point. In some embodiments, the determining of the cost associated with one of the candidate points is further based on a difference between the height of the one candidate point and the first point, when the height of the one candidate point is greater than the height of the first point.

In some embodiments, the determining of the cost is further based on a distance between each candidate point and an end point. In some embodiments, the determining of the cost is further based on one or more status indicators associated with the aerial vehicle during a previous flight at the each candidate point. In some embodiments, a height of a surface point corresponding to the target point is unknown to the aerial vehicle. In some embodiments, the target point for a particular candidate point is a nearest point to the particular candidate point of which a surface height is unknown to the aerial vehicle.

In some embodiments, the method further comprises determining a first cost associated with a segment connecting a preceding point of the first point and the selected candidate point; determining a second cost associated with a segment connecting the preceding point of the first point and the first point; determining a third cost associated with a segment connecting the first point and the selected candidate point; and including a segment connecting the preceding point of the first point and selected candidate point into the flight path, when the first cost is lower than a summation of the second cost and the third cost. In some embodiments, the method further comprises determining if the segment connecting the preceding point of the first point and the selected candidate point is obstacle free.

In another aspect, a system for planning a flight path for an aerial vehicle is provided. The system comprises one or more processors; and one or more memories having instructions stored thereon which when executed by the one or more processors cause the processor to perform: identifying a plurality of candidate points, wherein the plurality of candidate points are in a predetermined relationship with a first point; determining a cost associated with each candidate point of the plurality of candidate points, wherein the determining of the cost is at least based on a distance between each candidate point and a target point, wherein the target point is associated with a surface height with respect to a reference level; selecting one candidate point from the plurality candidate points, when the cost associated with the selected candidate point satisfies a predetermined condition; and including a segment connecting the first point and the selected candidate point into the flight path, thereby planning the flight path.

In another aspect, a non-transitory computer-readable storage medium with instructions stored thereon that, when executed by a computing system, cause the computing system to perform a method of planning a flight path for an aerial vehicle. The method comprises identifying a plurality of candidate points, wherein the plurality of candidate points are in a predetermined relationship with a first point; determining a cost associated with each candidate point of the plurality of candidate points, wherein the determining of the cost is at least based on a distance between each candidate point and a target point, wherein the target point is associated with a surface height with respect to a reference level; selecting one candidate point from the plurality candidate points, when the cost associated with the selected candidate point satisfies a predetermined condition; and including a segment connecting the first point and the selected candidate point into the flight path, thereby planning the flight path.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
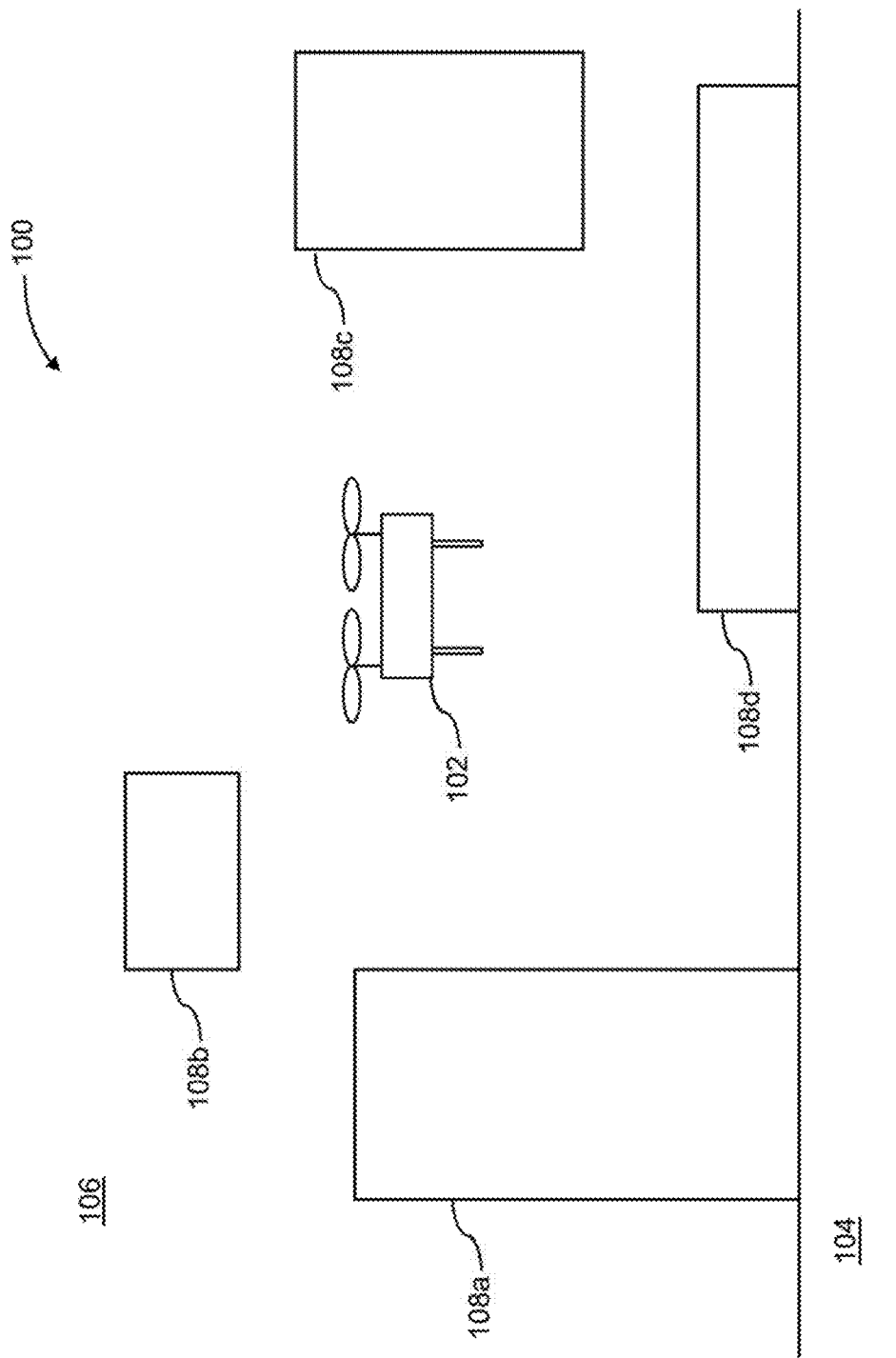
FIG. 1 illustrates a UAV operating in an outdoor environment, in accordance with embodiments.

Systems and methods are provided for controlling movable objects such as an unmanned aerial vehicle (UAV). In some embodiments, the UAV can be adapted to carry a plurality of sensors configured to collect environmental data. Some of the sensors may be of different types (e.g., a vision sensor used in combination with a proximity sensor). The data obtained by the plurality of sensors can be combined to generate an environmental map representative of the surrounding environment. In some embodiments, the environmental map can include information regarding the location of objects including obstacles in the environment. The UAV can use the generated map to perform various operations, some of which may be semi-automated or fully automated. For instance, the environmental map can be used to automatically determine a flight path for the UAV to navigate from its current location to a target location. The environmental map may be useful when the UAV performs an auto-return function from its current location to a start position, or any other specified position. As another example, the environmental map can be used to determine the spatial disposition of one or more obstacles and thereby enable the UAV to perform obstacle avoidance maneuvers. Advantageously, the use of multiple sensor types for collecting environmental data as disclosed herein can improve the accuracy of environmental mapping even in diverse environments and operating conditions, thereby enhancing the robustness and flexibility of UAV functionalities such as navigation and obstacle avoidance.

The embodiments provided herein can be applied to various types of UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

Turning now the drawings, FIG. 1 illustrates a UAV 102 operating in an outdoor environment 100, in accordance with embodiments. The outdoor environment 100 may be an urban, suburban, or rural setting, or any other environment that is not at least partially within a building. The UAV 102 may be operated relatively close to the ground 104 (e.g., low altitude) or relatively far from the ground 104 (e.g., high altitude). For example, a UAV 102 operating less than or equal to approximately 10 m from the ground may be considered to be at low altitude, while a UAV 102 operating at greater than or equal to approximately 10 m from the ground may be considered to be at high altitude.

In some embodiments, the outdoor environment 100 includes one or more obstacles 108a-d. An obstacle may include any object or entity that may obstruct the movement of the UAV 102. Some obstacles may be situated on the ground 104 (e.g., obstacles 108a, 108d), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 104, water, manmade structures, or natural structures. Alternatively, some obstacles may be wholly located in the air 106 (e.g., obstacles 108b, 108c), including aerial vehicles (e.g., airplanes, helicopters, hot air balloons, other UAVs) or birds. Aerial obstacles may not be supported by the ground 104, or by water, or by any natural or manmade structures. An obstacle located on the ground 104 may include portions that extend substantially into the air 106 (e.g., tall structures such as towers, skyscrapers, lamp posts, radio towers, power lines, trees, etc.).

Figure 2:
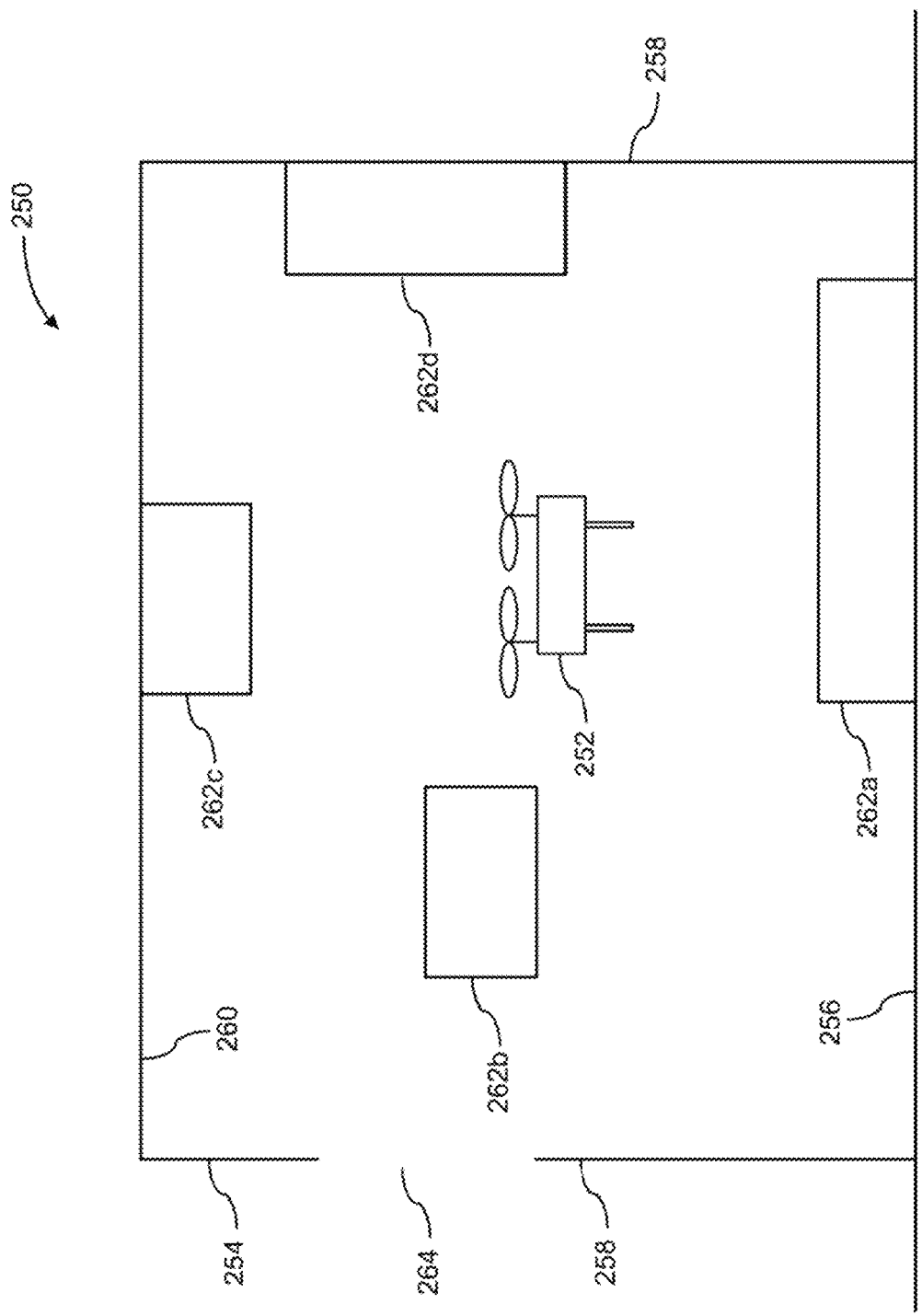
FIG. 2 illustrates a UAV operating in an indoor environment, in accordance with embodiments.

FIG. 2 illustrates a UAV 152 operating in an indoor environment 250, in accordance with embodiments. The indoor environment 250 is within the interior of a building 254 having a floor 256, one or more walls 258, and/or a ceiling or roof 260. Exemplary buildings include residential, commercial, or industrial buildings such as houses, apartments, offices, manufacturing facilities, storage facilities, and so on. The interior of the building 254 may be completely enclosed by the floor 256, walls 258, and ceiling 260 such that the UAV 252 is constrained to the interior space. Conversely, at least one of the floor 256, walls 258, or ceiling 260 may be absent, thereby enabling the UAV 252 to fly from inside to outside, or vice-versa. Alternatively or in combination, one or more apertures 264 may be formed in the floor 256, walls 258, or ceiling 260 (e.g., a door, window, skylight).

Similar to the outdoor environment 100, the indoor environment 250 can include one or more obstacles 262a-d. Some obstacles may be situated on the floor 256 (e.g., obstacle 262a), such as furniture, appliances, human beings, animals, plants, and other manmade or natural objects. Conversely, some obstacles may be located in the air (e.g., obstacle 262b), such as birds or other UAVs. Some obstacles in the indoor environment 250 can be supported by other structures or objects. Obstacles may also be attached to the ceiling 260 (e.g., obstacle 262c), such as light fixtures, ceiling fans, beams, or other ceiling-mounted appliances or structures. In some embodiments, obstacles may be attached to the walls 258 (e.g., obstacle 262d), such as light fixtures, shelves, cabinets, and other wall-mounted appliances or structures. Notably, the structural components of the building 254 can also be considered to be obstacles, including the floor 256, walls 258, and ceiling 260.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner.

In order to ensure safe and efficient operation, it may be beneficial to provide the UAV with mechanisms for detecting and identifying environmental objects such as obstacles. Additionally, recognition of environmental objects such as landmarks and features can facilitate navigation, particularly when the UAV is operating in a semi-autonomous or fully autonomous manner. Furthermore, knowledge of the UAV's precise location within the environment, as well as its spatial relationship to surrounding environmental objects, can be valuable for a wide variety of UAV functionalities.

Accordingly, the UAVs described herein can include one or more sensors configured to collect relevant data, such as information relating to the UAV state, the surrounding environment, or the objects within the environment. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors described herein can be carried by the UAV. A sensor can be situated on any suitable portion of the UAV, such as above, underneath, on the side(s) of, or within a vehicle body of the UAV. Some sensors can be mechanically coupled to the UAV such that the spatial disposition and/or motion of the UAV correspond to the spatial disposition and/or motion of the sensors. The sensor can be coupled to the UAV via a rigid coupling, such that the sensor does not move relative to the portion of the UAV to which it is attached. Alternatively, the coupling between the sensor and the UAV can permit movement of the sensor relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the UAV. Furthermore, the sensor can be electrically coupled with a portion of the UAV (e.g., processing unit, control system, data storage) so as to enable the data collected by the sensor to be used for various functions of the UAV (e.g., navigation, control, propulsion, communication with a user or other device, etc.), such as the embodiments discussed herein.

The sensors can be configured to collect various types of data, such as data relating to the UAV, the surrounding environment, or objects within the environment. For example, at least some of the sensors may be configured to provide data regarding a state of the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system (e.g., relative to the UAV or another entity). For example, a sensor can be configured to determine the distance between the UAV and the user controlling the UAV, or the distance between the UAV and the starting point of flight for the UAV.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein. Obstacle information may include information regarding the number, density, geometry, and/or spatial disposition of obstacles in the environment.

In some embodiments, sensing results are generated by combining sensor data obtained by multiple sensors, also known as "sensor fusion." For instance, sensor fusion can be used to combine sensing data obtained by different sensor types, including as GPS sensors, inertial sensors, vision sensors, lidar, ultrasonic sensors, and so on. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

In some embodiments, a UAV can maintain communication with a control device, typically operated by a user on the ground. Indirect or direct communications between the UAV and the control device may be provided. For example, the UAV may maintain indirect communication with the control device over a communication network, such as a cellular network. In another example, the UAV may maintain direct communication with the control device via a direct, short-range wireless communication channel.

One-way or two-way communications may be provided between the UAV and the control device. Typically, the control device transmits control signals to the UAV to guide the flight of the UAV. The control data from the control device may control operation of the UAV, and/or a payload carried by the UAV. Operation of the UAV propulsion units, flight controller, navigation module, one or more sensors, a carrier of the UAV, landing stand of the UAV, and/or communication module of the UAV may be controlled.

The UAV may transmit data generated by its sensors, motor, or other information to the control device, which may be useful in further guiding the flight. Any description herein of sensor data may include any data from the UAV to the control device including, but not limited to, data collected by sensors about an external environment, and/or operational status data about the UAV. Data about the external environment of the UAV may include, but is not limited to image data, distance or depth profiles, satellite signals, and so on. Operational status data about the UAV may include, but is not limited to, information about power provided to propulsion units of the UAV, power consumed by the propulsion units, navigation of the UAV, attitude of the UAV, disposition of the carrier, disposition of a payload, communication of the UAV, or energy storage and/or consumption of the UAV. As an example, operational status data indicates an internal condition of the UAV, such as that the energy level is adequate or the battery level is low. As another example, sensor data indicates a current condition of the flight environment, which may include an obstacle ahead that does not exist on an existing map, as discussed above, or an inclement weather condition. The transmission is typically performed periodically but can be adjusted as necessary.

In some embodiments, a UAV is configured to collect data during its flight and builds 2D or 3D maps based on the collected data. As one example, the UAV can track various types of wireless transmission. The UAV may track wireless signals in order to monitor wireless communication environment. For example, the UAV may track incoming GPS signals, incoming control signals, outgoing data signals, etc. The UAV may track signals that are used for navigation, flight control, sensors, image transmission, or any other type of communication. The UAV may track whether a wireless communication channel is available, bandwidth, signal strength, signal to noise ratio, and/or any other aspect of wireless transmission. The UAV may track wireless transmission at different locations. A resulting signal map can provide the UAV with reference signal strengths in a particular air space. As another example, the UAV can keep track of the presence or absence of any object in the air space. In addition to data collected by its sensors, the UAV can incorporate data collected by other UAVs or recorded in other data sources before or during the flight or at any time. For example, various terrain maps and weather maps are available for public consumption. The UAV can also update its maps for specific coordinates based on new data generated by its sensors or obtained from other sources at any time.

In some embodiments, in order for a UAV to have a higher flying efficiency, the UAV can include only one sensor for a reduced weight or design complexity. The sensor can be located in the front with a detection range in front of the UAV. For example, a camera can capture a view with a proper resolution, or a laser can detect distance to objects with a sufficient accuracy, within the detection range that can be characterized by a certain height, width, and depth with respect to the position of the sensor. In addition, the UAV can include a single sensor that is positioned on the back or the side of the UAV where it can have a proper detection range. The sensor data can be processed to build a 2D elevation map, which indicates height information for each point in a 2D coordinate system with respect to a reference level, such as the ground level.

Figure 3:
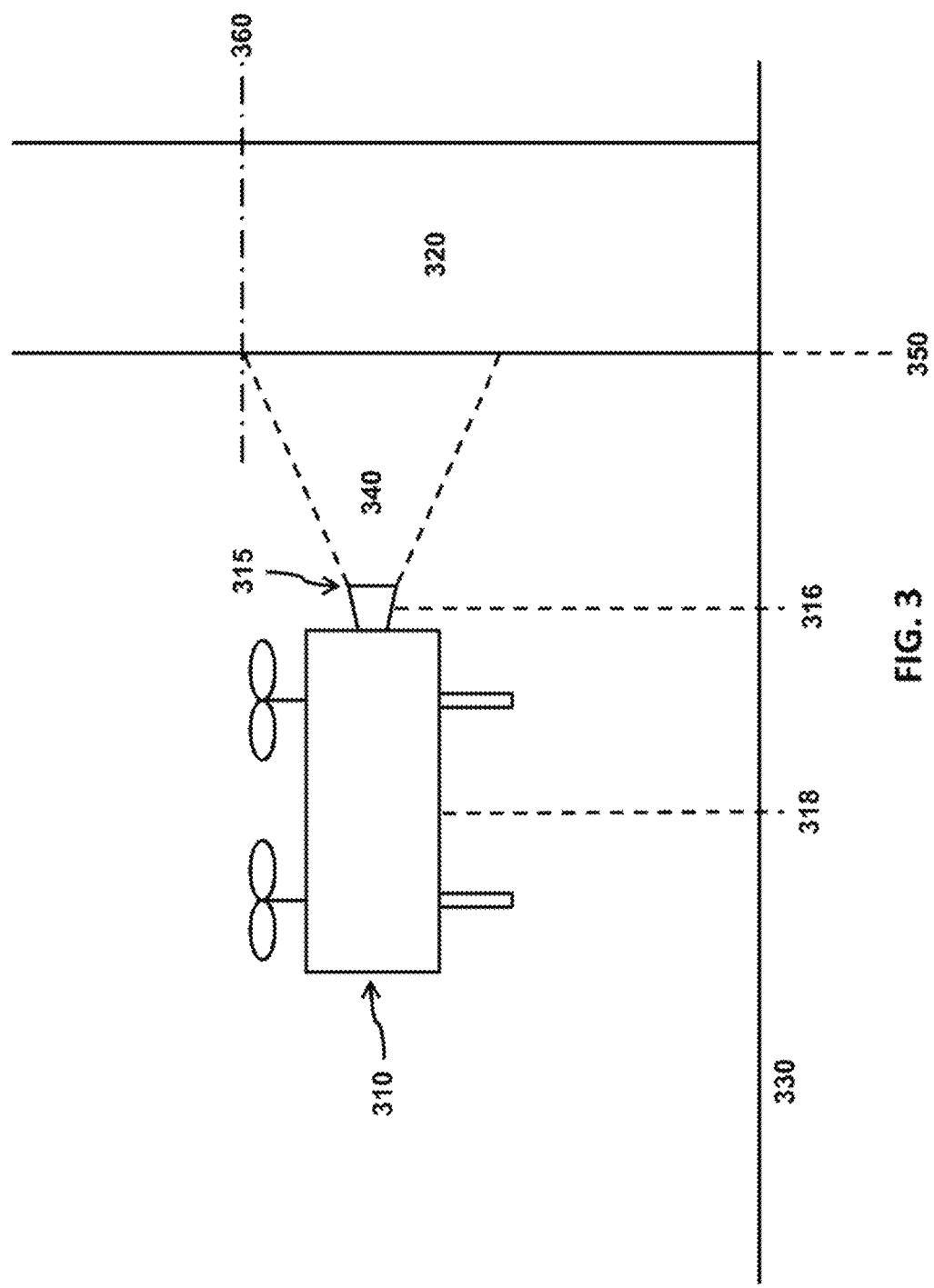
FIG. 3 illustrates how an UAV obtains data for a 2D elevation map.

FIG. 3 illustrates how an UAV obtains data for a 2D elevation map. An object 320 that extends from a reference level 330 at the point 350 intersects the detection range 340. However, only a mid-portion of the object 320 is in the detection range, while the top of the object 320 is not. By analyzing the data generated by the sensor 315 corresponding to the detection range 340, the UAV can conclude that the top of the object 320 is higher than the top of the detection range 360, or in other words, the distance from top of the detection range 360 to the reference level is a minimum value for the surface height at the point 350. Therefore, the UAV can store in the elevation map that distance as an estimate of the surface height at the point 350 having a 2D coordinate with respect to the reference level and a category indicating that the estimated value is a lower threshold or a minimum value for the surface height. The UAV can similarly create data for the 2D elevation map when the top of an object is within or below the detection range. Details regarding the construction and maintenance of 2D elevation maps can be found in the co-pending application titled "Construction and Update of Elevation Maps" filed on Nov. 14, 2016, which is hereby incorporated by reference in its entirety. Alternatively, a plurality of sensors may be provided on the UAV. The different sensors may have different fields of view.

In some embodiments, the resulting 2D elevation map includes information in addition to an estimated height for each 2D coordinate, such as a confidence indicator, including a risk of crashing into an obstacle regarding the estimate. For example, the 2D elevation map can indicate, for each 2D coordinate, a height estimated from certain sensor data, together with a category indicating whether the estimated height would be the actual value ("green category" hereinafter), a minimum value ("red category" hereinafter), or a maximum value ("blue category" hereinafter) of an actual surface height at the 2D coordinate. The 2D elevation map can also indicate, for a coordinate with no information available, a default or a maximum value as the estimated height and a category indicating that the estimated height is of no use ("blank category" hereinafter). The 2D elevation map can also include confidence indicators or other indicators of the quality of the estimate, such as capabilities of sensor, visibility at the time sensor data was generated, etc. The confidence indicators can be implemented by numbers, strings, or other ordinal values. In some embodiments, the confidence indicators can be represented as the categories. Different values for the confidence indicators can represent different levels of risk of obstruction or danger. For example, the blank, red, blue, and green categories indicate increasing levels of risk of obstruction or danger. In another example where the confidence indicators are represented by numeric values, a higher confidence indicator can represent a higher risk, whereas a lower confidence indicator can represent a lower risk. Alternatively, a lower confidence indicator can represent a higher risk, and vice versa. Such a 2D elevation map is relatively easy to build and maintain and can be used to avoid obstacles or other undesirable locations in determining flight paths.

Figure 4:
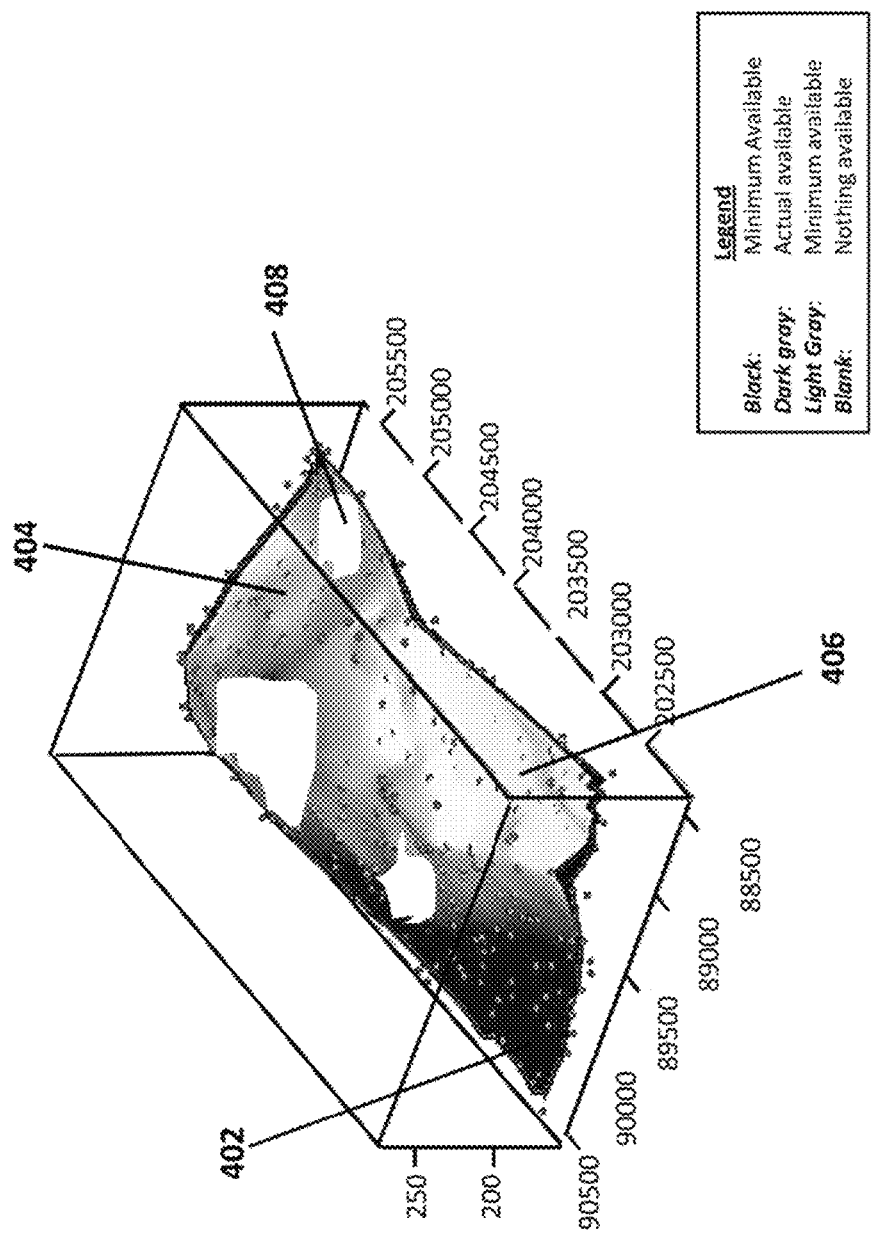
FIG. 4 illustrates a 2D elevation map based on data collected by a front-view sensor.

FIG. 4 illustrates a 2D elevation map based on data collected by a front-view sensor. The landscape shows the estimated heights for the 2D coordinates on the ground, while the coloring of the landscape shows the confidence indicators for the estimated surface heights of the corresponding 2D coordinates. The coloring can also indicate the categories for the estimated surface heights. For example, the black color can correspond to the red category, the dark gray color can correspond to the green category, the light gray color can correspond to the blue category, and no or blank color can correspond to the blank category. Therefore, the 2D coordinate for the point 402 has a red category, meaning that the surface height for the point 402 is the minimum of an actual surface height at the 2D coordinate. Similarly, the 2D coordinate for the dark gray point 404 has a green category, the 2D coordinate for the light gray point 406 has a blue category, and the 2D coordinate for the white point 408 has a blank category. Such a visual representation can be useful to a user controlling the UAV.

In some embodiments, the 2D elevation map includes, in addition to an estimated height for each 2D coordinate and a confidence indicator associated with the estimated surface height, a height range to which the estimated surface height belongs. The height range information can be especially useful for 2D coordinates having multiple surface heights due to existence of objects that do not extend all the way from the ground.

Figure 5:
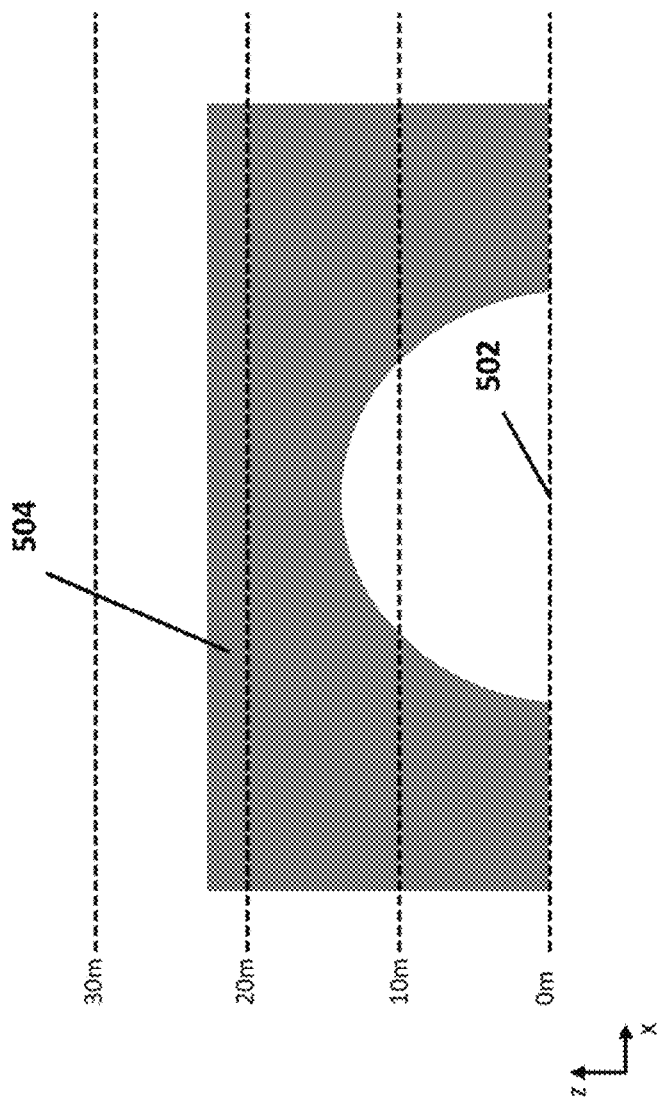
FIG. 5 illustrates a scenario where multiple surface heights exist for a 2D coordinate.

FIG. 5 illustrates a scenario where multiple surface heights exist for a 2D coordinate. The estimated surface height and the confidence score determined for the point 502 under the bridge 504 could be different depending on a height range. For example, a UAV might determine that the surface height for the point 502 within a height range between 0 m and 10 m does not exceed 10 m, while the a UAV might determine that the surface for the point 502 within a height range between 10 m and 20 m is at least 20 m. Therefore, given a 2D elevation map that includes a height range associated with an estimated height for a 2D coordinate, a UAV can compare the height range with its current flying altitude to better determine its flight paths, possibly taking advantage of additional flying space, such as the area under a bridge. For example, the height range can be selected based on a current altitude of the UAV. For example, a first height range of 0 m to 10 m may be selected if the altitude of the UAV falls between 0 m and 10 m above ground; a second height range of 10 m to 20 m may be selected if the altitude of the UAV falls between 10 m and 20 m above ground. Depending on the selected height range, different estimated surface heights and confidence indicators may be determined for the same 2D point. A flight path with respect to a given 2D point can be determined based on the estimated surface height and the confidence indicator for the 2D point (2D elevation data), taking into consideration the height range associated with the 2D elevation data and/or an altitude of the UAV.

In some embodiments, a UAV can classify each point in a region based on what types of information is available for the location. For example, the UAV may distinguish those points that have been detected by its sensors during the current flight, during a previous flight (which may be any flight made before the current point in time, any flight before the UAV made the last stop, etc.), or during any flight by one of a group of predetermined UAVs that belong to the same organization or have access to the same elevation maps, or a combination thereof. The UAV may also distinguish those points for which any information has been collected in any manner from those points for which no information has ever been collected. The availability of information makes the distinguished points "safe" in a way, although the degree of safety can vary depending on who generated the information, how the information was generated, when the information was generated, and so on. Generally, a point is not safe to a UAV unless it is accessible or reachable to the UAV. A point may be unreachable to the UAV due to the nature of the point (e.g., presence of obstacles or bad weather), the operational state of the UAV (e.g., lack of fuel), etc. In addition, certain points can be designated for special purposes. For example, the starting point of the current flight or a list of usual takeoff and landing points can be determined and marked in a map. A list of service points where the UAV can be serviced—receiving energy or other supplies, replacement parts, check-ups, tune-ups, repairs, and so on can be identified.

In some embodiments, an airborne UAV may need to find a new flight path in response to an abnormal and often emergency situation. For example, data transmission from or to the UAV may be intermittent or otherwise interrupted, resulting in weak or disappearing signals. When a user is controlling flight of the UAV from a remote control, loss of the control signal may mean that the UAV needs to autopilot or risk ending in a crash. When navigation signals, such as GPS are lost, the UAV may not have an accurate indication of the UAV's location. Alternatively, the UAV may have to rely on other navigation techniques to ascertain the UAV's location which may be less accurate (e.g., may "drift" over time) or may use more energy. In some instances, data transmission by the UAV, such as image transmission, may be lost, which may present more challenges for a user who is trying to control the UAV remotely. Weather condition may be stormy or otherwise affecting vehicle operation, including sensor performance. The batteries on the UAV may become depleted during flight, and the UAV may be reaching a low energy level beyond which the UAV may not have enough energy to return. Vehicle parts may be failing due to mechanical, electrical, or other problems, such as part breakage detachment, circuit errors, battery drains, etc.

In any of these scenarios, it would be highly desirable to first restore the normal condition, often by finding a new flight path to a possibly new destination. For example, upon determining that wireless transmission is intermittent or non-existent, the UAV would want to reach an area where wireless transmission is successful and uninterrupted. The determination can be made from a failure to receive normal control signals from a control device or GPS signals from the satellites, a failure to transmit relevant data to the control device, repeated notifications from the control device for receiving no or little data, etc. for a specific period of time. Similarly, the UAV would want to reach an area where the air condition is calm and clear or where vehicle services are available.

In some embodiments, when the communication channel between a UAV and a control device is not broken, especially when transmission of control signals continues to be acceptable, the control device can instruct the UAV to follow a specific flight path to reach a specific destination, such as the starting point (flight take-off point) or one of the designated points where the abnormal condition is likely to be resolved. A designated point can be the last known location of the user (e.g., based on location of the remote controller), a pre-set "home" point designated by the user, an earlier location on the current flight or previous flight, etc. When the communication channel is broken, however, the UAV could automatically determine a flight path to reach an appropriate destination. The UAV may be able to autonomously or semi-autonomously initiate and/or execute the process to reach the appropriate destination. The UAV may initiate and/or execute the process to reach the appropriate destination without human aid or intervention, and/or any instructions from any devices external to the UAV.

As previously described, a UAV may initiate a process to reach the appropriate destination in response to one or more detected conditions. The one or more detected conditions may fall into one or more different reason categories. In some embodiments, a plurality of reason categories may be predetermined. Examples of reason categories may include, but are not limited to, user instruction, GPS signal loss, remote controller signal loss, image transmission loss, other wireless signal loss, low battery, and/or component failure. The UAV may identify which reason category that a detected condition falls under. Depending on the reason category, the UAV may select a flight mode to reach the appropriate destination. Further descriptions of flight modes are provided in greater detail elsewhere herein. In some embodiments, a single flight mode may correspond to a single reason category. Alternatively, multiple flight modes may correspond to a single reason category, or single flight modes may correspond to multiple reason categories.

In some embodiments, a UAV is configured to automatically determine a flight path in response to an abnormal condition based on a variety of factors without human intervention, including an automatic return to one of the locations detected by onboard sensors since take-off. The UAV can fly in any of different navigation modes. For example, the UAV can fly a "safe" mode where the flight path is limited to "safe" points for which adequate information for safe flight is available based on sensor data previously generated by this or other UAVs. Such information can be related to the presence or absence of obstacles, climate conditions, crowdedness, etc. The UAV can also fly in an "exploring" mode where the flight path is not so limited and can be flexible to achieve specific objectives, such as flying the shortest distance. It is possible to have a layered structure for different navigation modes, where starting with the safe mode, each mode is less restrictive than the next, based on the number of points in space that can be considered in determining a flight path, the amount of time it takes to reach the next destination, and so on. It is also possible to have different navigation modes for achieving different objectives.

In some embodiments, to restore the normal condition as soon or easily as possible, the UAV can choose to limit the upcoming flight to the "safe" points for which adequate information is available, as discussed above, thereby flying in a safe mode. Specifically, the UAV may search among the safe points in finding a desirable flight path, so that the UAV will follow a flight path along these safe points. This approach tends to reduce the search space as well as the likelihood of aggravating the abnormal condition. In the safe mode, one simple flight path is a reverse route. For example, after failing to transmit data to a control device for a period of time, the UAV can backtrack to a point where wireless transmission strength was strong, a region where data transmission rate was above a threshold, or any other safe point according to the maps. The flight path can be systematically determined in other ways, as discussed below. The UAV can dynamically determine when to enter or leave a mode based on real-time information related to user input, environment conditions, UAV operational status, etc.

In some embodiments, once the abnormal condition is resolved, the UAV is configured to determine another flight path in real time. At this point, it is less important to limit the flight to safe points, and thus the UAV can be flexible in determining its flight path, thereby entering an exploring mode. The UAV can hover to gather and assess data, or it can incrementally determine the flight path as it travels. The hovering can continue until the receipt of user instructions from a control device, until the determination of a new flight path, until the end of a specific period of time, etc. The user instructions may determine the subsequent flight path. Otherwise, the UAV may select the next destination and determine a corresponding flight path based on the current condition of the environment or the vehicle. As one example, after a struggle through a bad-signal region, the energy or battery level may be low, and the UAV can then select a service stop for a refill or recharge. As another example, it might be important to reach the original destination to be reached before the abnormal condition arose, and the UAV can return to the flight path it was following before the abnormal condition arose. As yet another example, there might be little time left to go anywhere, and then the UAV can head straight back to the starting point.

In some embodiments, upon reaching a safe point that was selected for restoring the normal condition, the abnormal condition may persist. The UAV can then repeatedly select additional safe points as subsequent destinations until the abnormal condition is resolved or some other criterion is met, such as when the number of repeated attempts or the amount of time spending on repeated attempts exceeds a predetermined threshold. The number of repeated attempts to make can be determined based on the distances to know safe points, the location of the UAV, the time remaining before the UAV is required to return to the take-off point, etc. Alternatively, as the safe points no longer prove to be advantageous, the UAV can enter the exploring mode until a specific criterion is met or stay in the exploring mode until it reaches the final destination.

Figure 6:
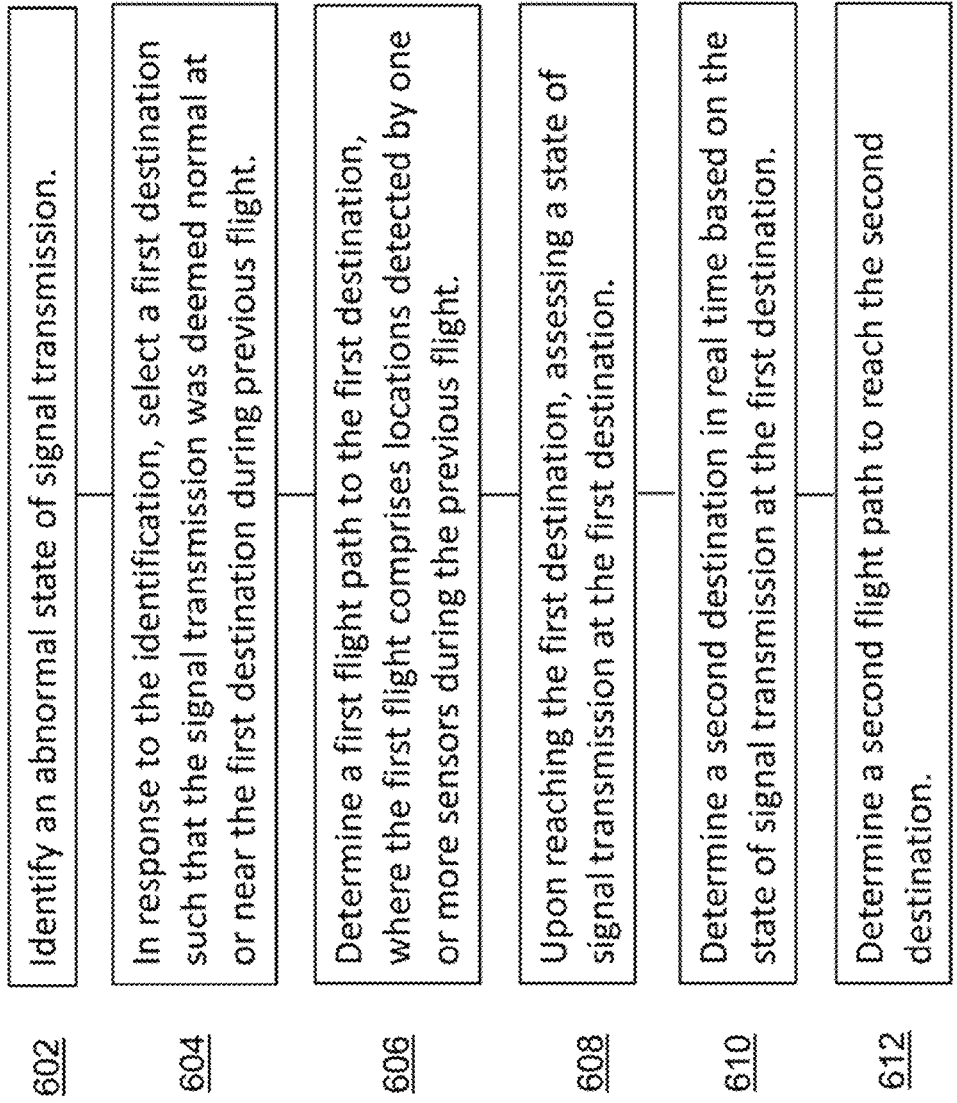
FIG. 6 illustrates an example process performed by a UAV in response to an abnormal condition.

FIG. 6 illustrates an example process performed by a UAV in response to an abnormal condition. In step 602, the UAV identifies an abnormal state of signal transmission (at a first location). The identification can be based on data generated by its sensors or motor. The abnormal state could be a loss or weakening of signals, which could be measured by the signal transmission rate over a period of time, possibly with respect to a minimum threshold. In step 604, the UAV selects a first destination such that signal transmission was deemed normal at the first destination or at a second location that is proximal to the first destination by the sensors of this or other UAVs at an earlier time. The proximity can be determined with respect to a predetermined distance. In step 606, the UAV determines a first path to the first destination. In some embodiments, the UAV travels to the first destination in the safe mode, which means that the UAV searches among only the "safe" points, those locations previously detected by the sensors of this or other UAVs, in building the first flight path. In step 608, upon following the first flight path to reach the first destination, the UAV assesses the state of signal transmission at the first destination.

In steps 610 and 612, the UAV determines the second destination in real time based on the current state of signal transmission at the first destination and determines the second flight path to reach the second destination. The determination can also be based on other current conditions, such as the control state of the remote device, the weather, the operational status of the aerial vehicle, etc. If the current state of signal transmission is normal as expected, the UAV can be less restrictive in selecting the second destination and the second flight path. Specifically, the UAV may no longer stay in the safe mode. In the absence of any commands from a user, the UAV can determine the best next destination. For example, if the current battery level is low, the UAV can select a service stop or a home base as the second destination and determines the quickest way to reach the second destination as the second flight path. On the other hand, if the current state of signal transmission is still not satisfactory, the UAV can repeatedly select another safe point as the second destination until the current signal condition is back to normal. The UAV can stay in the safe mode during this process. Alternatively, the UAV can immediately enter the exploring mode and choose the second destination based on real-time information.

In some embodiments, the UAV can generally follow a planned flight path. However, the UAV can also build a flight path in real time by repeatedly selecting a nearby intermediate destination or a mere flying direction each time without pre-selecting all the points on the flight path at once. The extent of "real time", which is generally deemed to depict immediate feedback without any purposeful delay, can be measured within minutes, seconds, tenths of seconds, etc. By building a flight path in this manner, the UAV can be highly adaptive and may better respond to abnormal conditions. For example, onboard sensors can generally detect objects that would constitute obstacles that need to be avoided for the UAV. Stationary obstacles may already be known, but moving obstacles may emerge. In addition, routine motor inspection may have been performed, but undetected or unexpected motor errors may arise. Therefore, upon detecting adverse situations, such as a motor failure or an obstacle in the way, the UAV can break from the planned flight path and build a new flight path in real time. When the adverse situations are overcome, the UAV can then return to the planned flight path as appropriate. On the other hand, the continuous need to determine next steps may cause less computing resources to be available for other tasks during the flight. It may thus be desirable for the UAV to select a few more destinations at a time or make less frequent real-time decisions, especially when the demand for computing resources is high.

In some embodiments, as long as control signals from a control device continue to be received by the UAV, the control device can continue to direct the UAV to follow specific flight paths. In cases where the UAV has automatically determined a flight path, the UAV can choose to override the control signals until it reaches the end of the flight path or some intermediate destination. This approach may be advantageous when the UAV needs to act quickly and avoid any delays, which may occur during the communication with the control device. Alternatively, the UAV can abandon the automatically determined flight path upon receiving a control signal so as to follow the instructions issued by the control device.

In some embodiments, a UAV may need to automatically determine a flight path through an air space. The UAV may determine a new flight path upon entering a new navigation mode, entering a distinct geographical region, encountering an abnormal condition, receiving instructions to reach a new destination, etc. The UAV may focus on predetermined points within the air space or regards the air space as a grid of points. The UAV can then choose a flight path through one or more of these points with respect to specific objectives. Example objectives include reducing the total flight time or distance, avoiding regions more likely to contain obstacles, and avoiding changes in flying altitude. To enable systematic searches for a desirable flight path, the UAV can build a cost function $c(s, s')$ by assigning a numerical cost to a segment between any two of these points s ands' depending on the specific objectives. Such a segment can represent a path segment that a UAV can follow in moving between the points s and s'. For example, the costs can be related to the length of the segment (distance between endpoints of the segment), the average energy consumption rate over the segment, the landscape along the segment, or other characteristics of the segment. The UAV can also assign a cost to each of these points. For example, the costs can be related to the likely presence of an obstacle, the typical temperature at the point, and the distance from the point to any "safe" point, etc. In general, any factor that may affect the "quality" of flight can be represented in a cost function, such as the wireless signal (control, GPS, data, etc.) transmission state (e.g., transmission rate, signal strengths, signal-to-noise ratio, etc.), weather condition (rain, snow, fog, hurricane, etc.), climate condition (wind, pressure, temperature, brightness, etc.), gravitational effect, and so on. A search can then be performed typically by building a route with a reduced or (local or global) minimum cost aggregated over the costs of the segments and points in the growing route. Generally, the cost function is built and the costs are assigned (obtained) in advance, and the costs can be looked up (obtained) during the search for a desirable flight path. For example, the cost function can be built for one region at a time, to be used for subsequent searches within that region. It is possible, however, to dynamically calculate (obtain) the cost for a segment every time the segment is considered in the search.

In some embodiments, a UAV is configured to assign costs based on a 2D elevation map discussed above. The cost can depend on the estimated height as well as the risk of encountering obstacles or one or more confidence indicators for each 2D coordinate in various ways. For example, a 2D coordinate having a larger estimated height, a larger height range known for the estimated height, a lower confidence indicator associated with the estimate, or any combination thereof may be considered less favorable for a flight path and hence lead to a higher cost. A point having such a 2D coordinate (sometimes called a "target point" below) should generally be avoided or assigned a lower priority. For example, any point in space that can be mapped to a 2D coordinate in the elevation map that is associated with a confidence indicator indicating a red category, such as a point on the object 402 in FIG. 4 (especially those below the estimated surface height), can be considered as part of an obstacle to be avoided in the flight path. As a result, a larger cost may be assigned a point or a segment which when projected to the reference level is closer to more of these unfavorable 2D coordinates. The cost can further depend on a category of an object associated with the target point. For example, a higher cost may be assigned to a point when its corresponding target In some embodiments, a UAV can incorporate costs determined from a 2D elevation map into the cost function in different ways. It's generally preferable to stay away from those points that are more likely to contain obstacles. Therefore, the UAV can associate more costs with being in proximity to those points where the estimated heights are above a certain threshold or where the categories are red or blank for the corresponding 2D coordinates in the 2D elevation map. In a more elaborate scheme, larger costs can be attached to areas close to those points where the estimated heights are higher the current flying altitude and those points where the estimated heights are no higher than the currently flying altitude and the categories are red or blank. Other schemes are possible. The proximity can be related to the physical distance, the travelling time, etc. Varying the cost by proximity to specific 2D coordinates means that such cost tends to peak around the specific 2D coordinates and gradually decrease as other coordinates that are less and less proximate to the specific 2D coordinates. It enables the selection of flight paths that have less proximity to those 2D coordinates.

To incorporate costs for proximity to 2D coordinates in the red category, for example, the cost assigned to each segment from a first point to a second point can be adjusted to be related to a combination (such as a sum) of the physical distance between the two points and the physical distance from the segment to the 2D coordinates in the red category. Generally, a search space can include a set of points within a region including a departure point and an arrival point for an UAV. The relationship between a point in the search space and a 2D coordinate in the red category or any point of interest that is not physically in the search space can be represented as an auxiliary segment, for example, and the cost attached to being proximal to a 2D coordinate in the red category may then be associated with such an auxiliary segment. Such an auxiliary segment is used to represent a relationship with a point of interest, such as proximity, with which a cost can be associated; it can but does not need to correspond to a path segment. A separate auxiliary segment can be used to represent proximity to each point of interest, or a single auxiliary segment can be used to represent overall proximity to all points of interest. For example, the overall proximity can correspond to the distance to the closest point of interest, or the average distance over the set of points associated with the red category and within a certain radius from the particular point. The distance between a segment and a specific point can be computed in various ways, such as a shortest distance or an average distance between the specific point and any point on the segment. Mathematically, incorporating costs for proximity to 2D coordinates can be done by updating an existing cost function $c(s, s')$ or adding another cost function $red\_cost(s, s')$. Alternatively, the cost assigned to each point (one of the endpoints of a segment) can be adjusted to be related to the physical distance from the point to 2D coordinates in the red category. Additional costs could be incorporated for proximity to 2D coordinates in the red and blank categories, a weighted proximity to 2D coordinates in different categories, or in additional ways. For instance, the weights could decrease for the blank, red, blue, and green categories, respectively. Additional costs could also be incorporated for proximity to other points generally to be avoided, such as points on human bodies to avoid collisions with humans or points that have not been detected by any known sensors onboard UAVs.

In some embodiments, a UAV can maintain a constant altitude to reduce gravitational effects and possible complications from changing altitudes. Specifically, searching for flight paths through points having different heights can require more computational resources and result in more complex flight paths than searching through points having the same or similar altitude. To avoid changes in flying altitude, upon detecting an obstacle, the UAV can decide to fly around it while maintaining the flying altitude rather than over it by increasing the flying altitude. However, it may be desirable to increase the flying altitude in some cases, such as when the width of the obstacle at the current flying altitude is much larger than the height of the obstacle with respect to the current flying altitude.

In some embodiments, a UAV is configured to incorporate costs based on height information for the points in the search space in different ways. For example, a higher cost may be associated with flying to a higher or different altitude. Similar to incorporating costs for proximity to 2D coordinates in certain categories on a 2D elevation map, the cost assigned to each segment or point can be adjusted to cover the cost related to the flying altitude. For instance, the original cost assigned to a segment from a first point to a second point can be the physical distance between the corresponding 2D coordinates at the ground level, and an additional cost can be added during execution of the path search algorithm when the increase in height from the first point to the second point is greater than a certain threshold. In addition, the UAV can weigh the vertical component and the horizontal components of the cost differently. For example, the UAV can assign a smaller weight to the cost associated with the distance between the corresponding 2D coordinates but a larger weight to the cost associated with the difference in heights.

In some embodiments, the UAV can utilize the flying altitudes included in 2D elevation maps in determining flight paths. For example, referring back to FIG. 5, the 2D elevation maps may include, in the form of (height range, category), (0 m~10 m, green), (10 m~20 m, red), and (20 m~30 m, blue). The 2D coordinate with (10 m~20 m, red), such as 502, would no longer correspond to an obstacle to the UAV when the UAV is flying at 8 m. Similarly, when the current flying altitude is 15 m, (10 m~20 m, red) would matter more to the UAV than (0 m~10 m, green) and (20 m~30 m, blue). One approach is to give priority to elevation data having height ranges that are closer to the current or desired flying altitude, such as by selecting the category associated with the height range that is closest to the current or desired flying altitude out of all the elevation data for a 2D coordinate. For example, when the UAV is flying at 8 m, green would be selected as the category for the point 502 and thus all points within 0 m~10 m above 502, and thus flying near any of these points would not be penalized. Clearly, this is a safe approach only when the UAV is to maintain more or less the same flying altitude. Another approach is to incorporate all elevation data. For example, regardless of the current flying altitude, the UAV treats the points above the 502 as being associated with different categories and could assign costs accordingly. The UAV may then have choices for its flying altitude, although in practice changing its flying altitude to 20 m would be discouraged. Yet another approach is to dynamically prioritize elevation data during execution of a path search algorithm based on the height of the last point on a growing route for the next point to be added to the growing route.

In some embodiments, a UAV can employ any path search algorithms known to someone of ordinary skill in the art, including A*, Theta*, D*, and their variants, to systematically determine a superior flight path from a source (starting point) to a destination (end point) using an objective function that represents the cost of a path from the starting point to the end point. Such a path search algorithm can operate by iteratively minimizing the value of the objective function over different routes from the starting point in the search space, with the value of the objective function increasingly closer to the actual cost of an actual path from the starting point to the end point. For example, the A* algorithm works by minimizing the following objective function $f(n)=g(n)+h(n)$, where n is the last point on a growing route, g(n) is the cost of a route from the start point to n, and h(n) is a heuristic that estimates the cost of the cheapest route from n to the end point. g(n) and h(n) can be combined by summation or other aggregation. The cost of a route can be the sum or other aggregation of costs assigned to all the segments and/or all the points on the route. The A* algorithm builds one or more growing routes until one of them reaches the end point, and the growing route that reaches the end point has the minimum possible cost when h(n) is admissible. Specifically, g(n) can be broken down into g(n's parent)+c(n's parent, n), where the parent refers to the previous or preceding point on the growing route; h(n) is often simply the (straight-line) distance from n to the end point. At each iteration, an n is identified and added to a growing route. Specifically, a set of candidates for n is identified. These candidates are typically neighbors of the last points on the existing growing routes (so connected to those last points by segments), but additional criteria can be imposed on choosing the candidates. For example, the set of candidates can be limited to those where the costs of the corresponding segments (which can correspond to the length of the segment or distance between the two points of the segment at both ends) are below a predetermined threshold. The candidate that leads to a minimal value of the objective function among all the candidates is then added to the growing route.

The Theta* algorithm works in a similar fashion except that it considers the presence of a line of sight and may replace existing segments with line-of-sight segments in the growing route. In one version, the Theta* algorithm considers path segments between the parent of the parent of n and n (referred as line-of-sight segments) at each iteration and replaces the two segments from the parent of the parent to n by a corresponding line-of-sight segment when the cost of the two segments is greater than the cost of the line-of-sight segment. Typically, the line of sight is considered for every candidate, and then the candidate that leads to a minimal value of the objective function among all the candidates is then added to the growing route as in A*. It is possible, however, to first identify n from the set of candidates as in A*, and consider whether to incorporate the line-of-sight segment for only the identified n instead.

Figure 7:
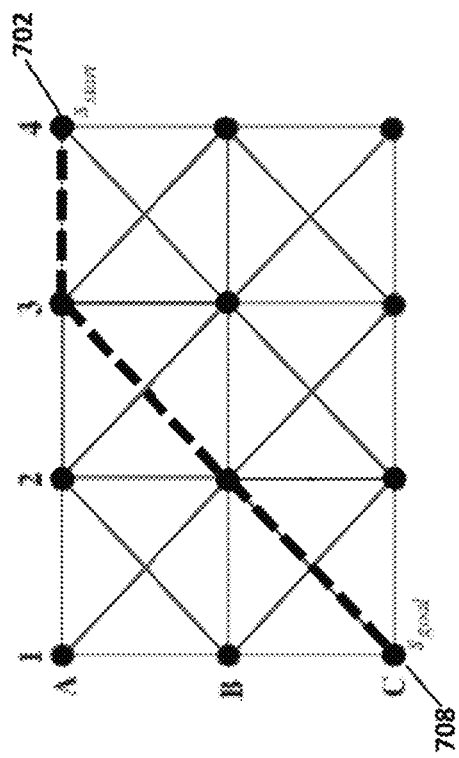
FIG. 7 illustrates an example process of determining a flight path in a region with no obstacle.
Figure 9:
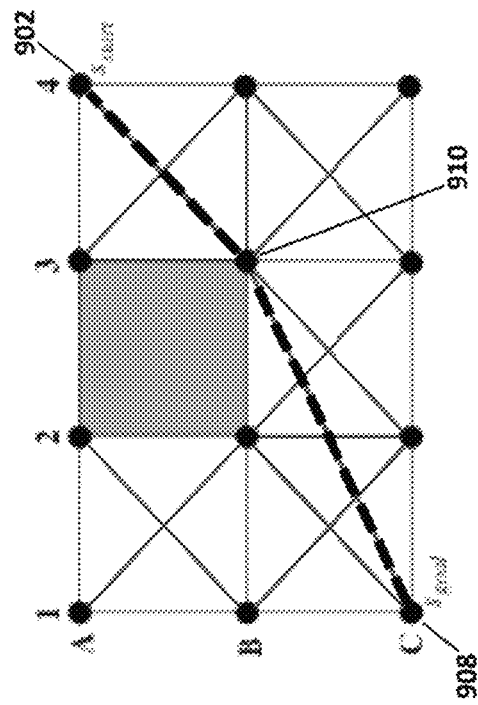
FIG. 9 illustrates another example process of determining a flight path in a region with an obstacle.
Figure 8:
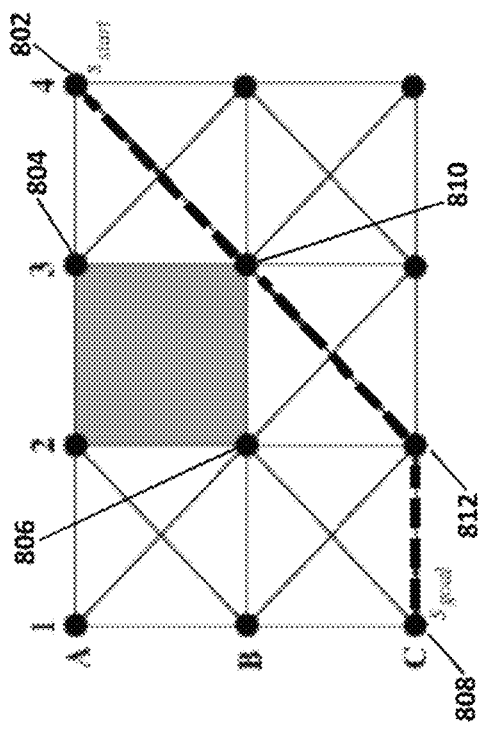
FIG. 8 illustrates an example process of determining a flight path in a region with an obstacle.

In some embodiments, a UAV can determine flight paths using different approaches in different regions. For example, the UAV can switch between A* and Theta*. The main difference between the A* and Theta* is that a flight path is built from predetermined segments between points in A*, while a flight path can include line-of-sight segments in Theta*. Since the line-of-sight segments essentially skip points, Theta* normally runs faster than A*. FIG. 7 illustrates an example process of determining a flight path in a region with no obstacle. A* could be used to find a shortest flight path from the source 702 to the destination 708, shown as the dotted line in FIG. 7. FIG. 8 illustrates an example process of determining a flight path in a region with an obstacle. The obstacle can be around points 804 and 806, and there may no longer be a segment from the point 804 to the point 806. The UAV can then assign additional costs to points or segments depending on how close they are to the points 804 and 806. A* can then be used to find a flight path that is short and away from the obstacle, shown as the dotted line from the point 802 through the points 810 and 812 to the point 808 in FIG. 8. FIG. 9 illustrates another example process of determining a flight path in a region with an obstacle, shown as the dotted line from the point 902 through the point 910 to the point 908. Theta* can be used instead to find a flight path that is short and away from the obstacle. Instead of applying A* or Theta* to find a route in a region, it is also possible to consider line-of-sight segments dynamically during the path-searching process based on how close the current point is to an obstacle. For example, while applying the A* algorithm, upon determining that n is not close to an obstacle, the system can temporarily consider the presence of a line of sight between the parent of the parent of n and n, or vice versa.

Figure 10:
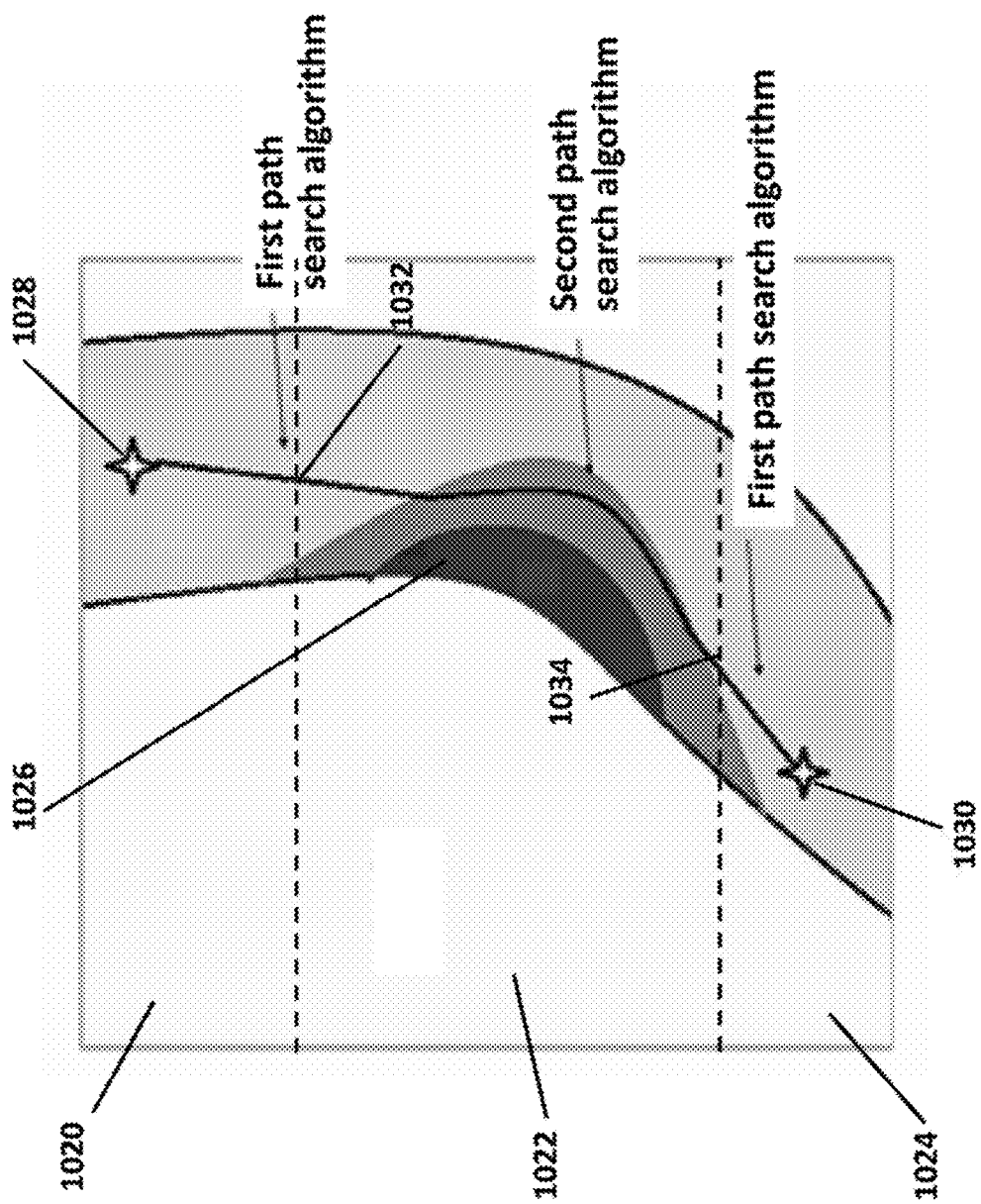
FIG. 10 illustrates an example approach of using different path search algorithms for different regions.

In some embodiments, a UAV is configured to choose which path search algorithm to use depending on whether the region to be searched include or are near known obstacles. As can be seen, while the flight path found by Theta* may be shorter than the flight path found by A*, it can be closer to the obstacle, especially when additional costs are associated with points rather than segments. Since the original routes are generally shorter than the line-of-sight routes, it may be easier to have finer control of the selection of the flight path. In addition, it may be easier to add costs to the points in the search space, which are considered regardless of which path search algorithm is used, than to the additional line-of-sight segments which are only used in Theta*. Therefore, the UAV can choose to utilize A* in regions around known obstacles and Theta* in other regions. FIG. 10 illustrates an example approach of using different path search algorithms for different regions. The box represents an air space, and the coloring (black, dark gray, light gray, and white) indicates, for the points in the air space, the categories of the corresponding 2D coordinates in the 2D elevation map. To go from the source 1028 to the destination 1030 through the air space, the UAV can first identify every region 1022 that may be within a certain distance away from where obstacles are likely to be present, such as those points 1026 where the corresponding 2D coordinates are associated with the red category in the 2D elevation map. The UAV can then find a flight path using A* to in that region 1022 and using Theta* in other regions 1020 and 1024. In this case, for each region, the UAV can select a set of possible regional sources and a set of possible regional destinations such that any flight path from the regional source to the region al destination runs in the general direction towards the (final) destination. The UAV can then take a simply flight path between the last regional destination and the current regional source, for example. In a simpler scheme, the UAV can first select a set of intermediate points 1032 and 1034, such as a set of points detected by sensors during previous flight. The UAV can then generally break the air space into regions 1020, 1022, and 1024 along these intermediate points. Depending on the likelihood that obstacles are present in each region, which may be indicated by the number of points where the corresponding 2D coordinates are associated with the red category, the UAV can then choose an appropriate path search algorithm. More generally, depending on the properties of different path search algorithms and the properties of different regions within the given air space, the UAV can choose other combinations of algorithms for different regions, different navigation modes, different reasons for changing flight paths, etc.

Figure 11:
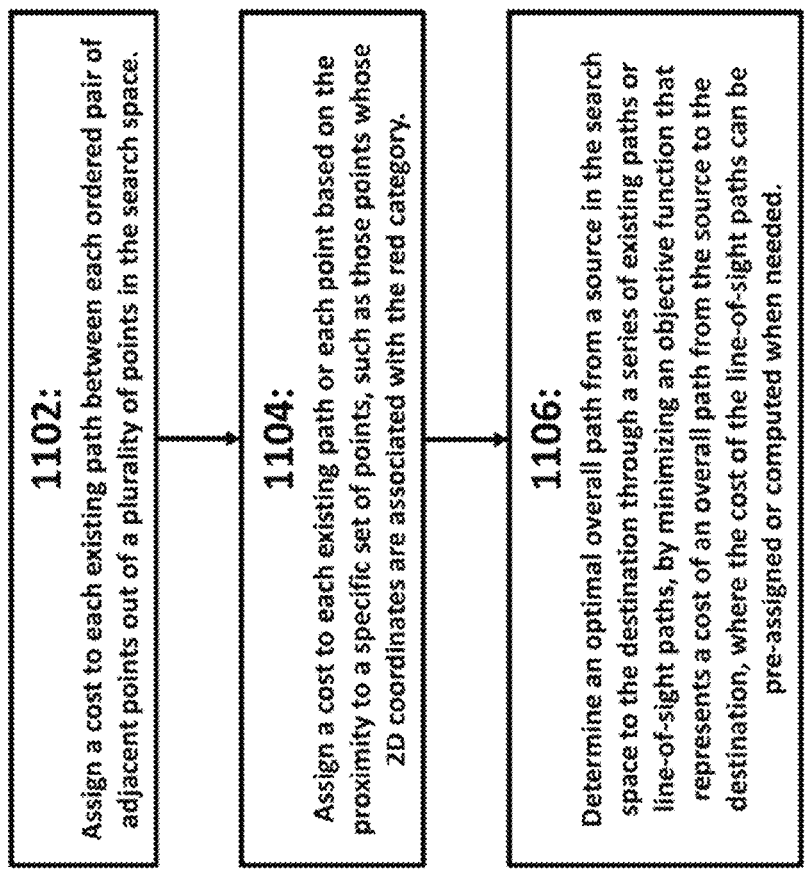
FIG. 11 illustrates an example process performed by a UAV to determine a flight path based on costs derived from a 2D elevation map.

FIG. 11 illustrates an example process performed by a UAV to determine a flight path based on costs derived from a 2D elevation map. The UAV starts with a set of points and a set of directed segments connecting some of these points in an air space. A directed segment normally exists between two points when they are considered adjacent to each other. The segment is typically directed as the cost of flying from point A to point B may be different from that of flying from point B to point A. The UAV then builds a cost function, which could incorporate different types of information, such as information available in a 2D elevation map discussed above. Specific costs can be assigned to the directed segments between adjacent points, to the individual points, to additional line-of-sight segments, and so on. In steps 1102 and 1104, the UAV builds the cost function. In step 1102, the UAV assigns a cost to each existing segment between each ordered pair of adjacent points (each directed segment) in the air space. The assignment could be based any combination of relevant factors, including the physical distance, the average battery level, the average GPS signal strength, the average signal transmission rate between the UAV and a remote device, etc. In step 1104, the UAV further assigns a cost to each point based on its relationship, such as proximity, to specific "dangerous" points, such as those whose 2D coordinates are associated with the red category in the 2D elevation map. The relationship between a point and a dangerous point can be represented by an auxiliary segment between the two points. Alternatively, the cost of each segment can be calculated every time the segment is to be considered in the search for a flight path. In step 1106, the UAV then executes a path search algorithm, such as A*, Theta*, or any variant, using the cost function it has built. To execute Theta*, the UAV needs to take into consideration additional line-of-sight segments and the costs associated with these segments. The UAV can pre-assign these additional costs to the line-of-sight segments or compute them on the fly, during the execution of the Theta* algorithm.

Figure 12:
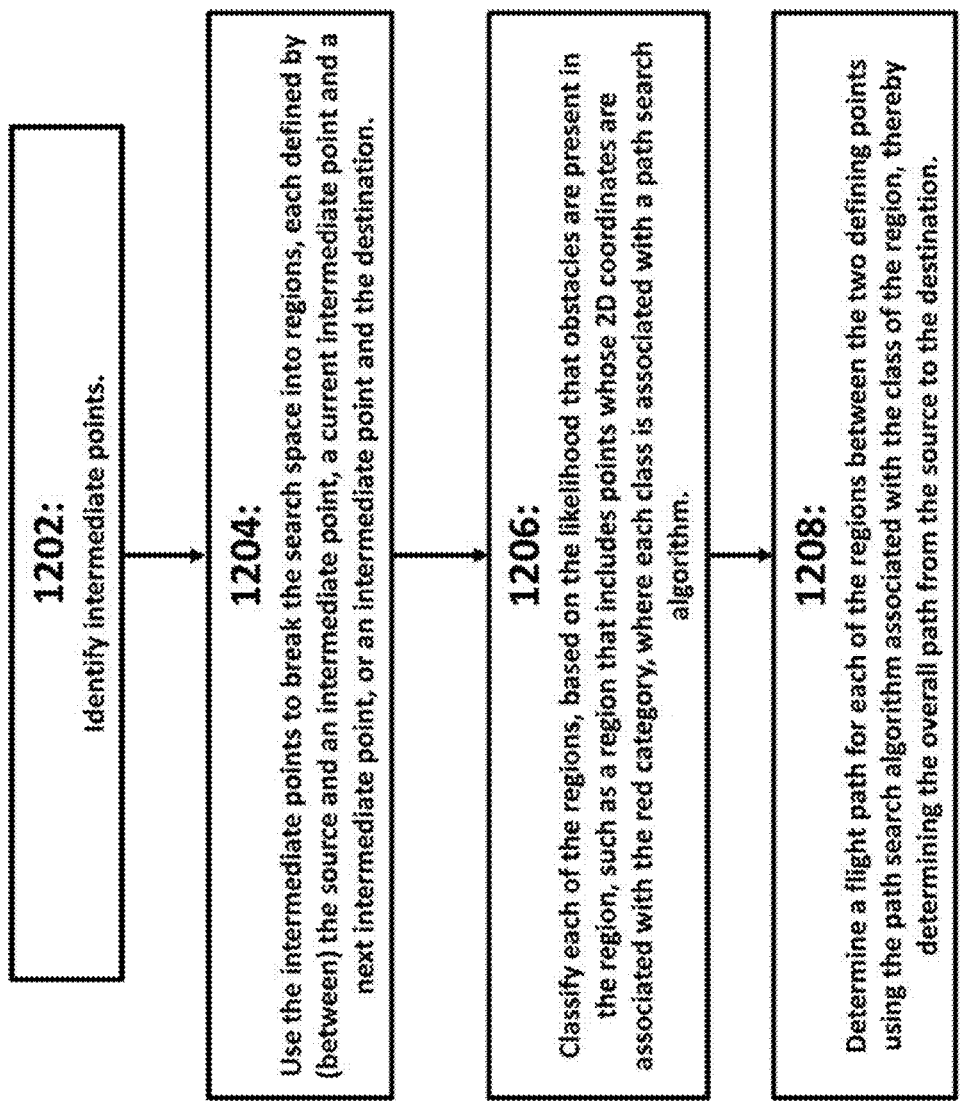
FIG. 12 illustrates an example process performed by a UAV to determine a flight path by determining connected sub flight paths through different regions using different path search algorithm.

FIG. 12 illustrates an example process performed by a UAV to determine a flight path by determining connected sub flight paths through different regions using different path search algorithm. Essentially, Step 1106 in FIG. 11 can be performed by this process. In steps 1202 and 1204, the UAV identifies intermediate points or intermediate destinations and uses these intermediate points to break the search space into regions. Each of the regions would then be at least partially defined by two intermediate points, or one intermediate point and the source or the destination. In an alternative approach, the UAV identifies the regions first and uses these regions to identify intermediate points. In step 1206, the UAV classifies each of the regions based on one or factors, such as the likelihood that obstacles are present in the region. For example, the UAV can classify a region that contains a point whose 2D coordinate is associated with a red category as a "dangerous" region, and any other region as a "safe" region. The UAV would also associate each class with a specific path search algorithm. For example, a dangerous region can be associated with A*, while a safe region can be associated with Theta*. In step 1208, the UAV determines a flight path for each region between its two defining points using the path search algorithm associated with the class of the region to determine the flight path for the UAV through the air space.

Figure 13:
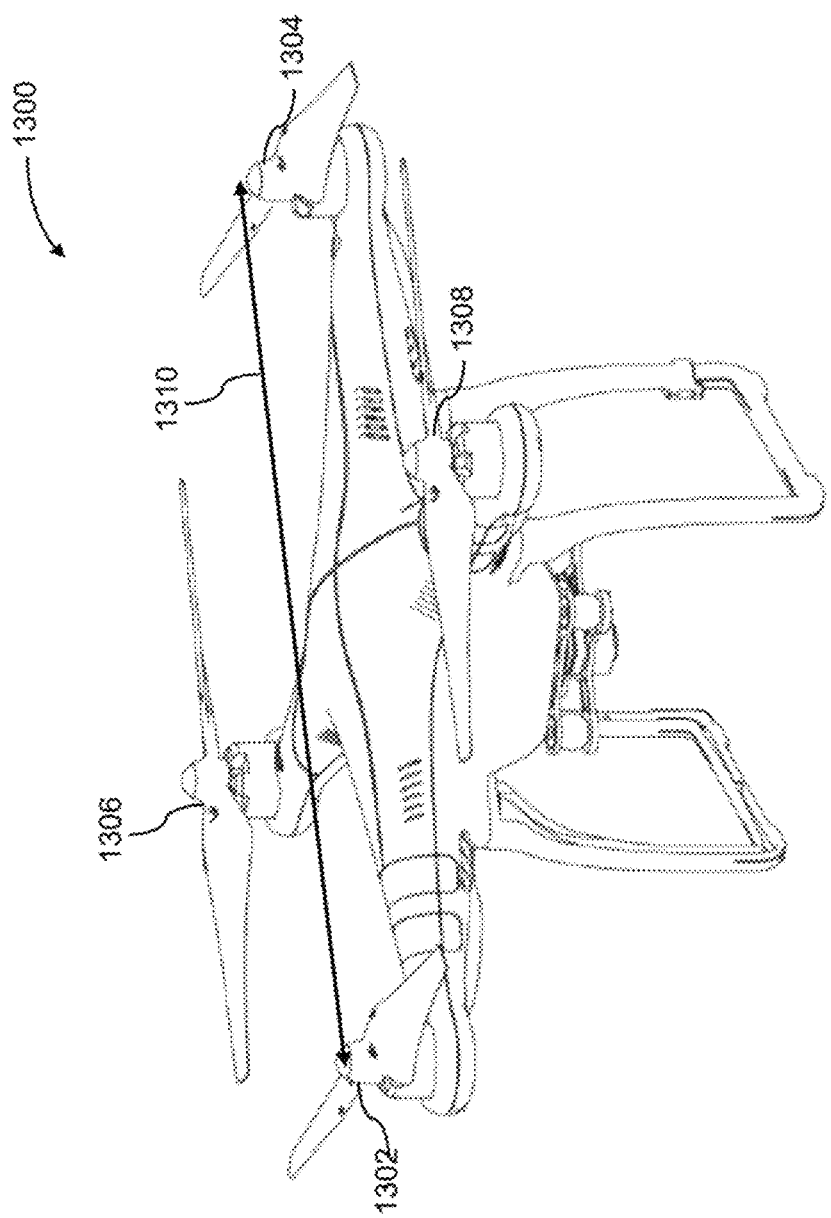
FIG. 13 illustrates a UAV, in accordance with embodiments.

FIG. 13 illustrates an unmanned aerial vehicle (UAV) 800, in accordance with embodiments of the present disclosure. The UAV may be an example of a movable object as described herein. The UAV 800 can include a propulsion system having four rotors 1302, 1304, 1306, and 1308. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1310. For example, the length 1310 can be less than or equal to 2 m, or less than equal to 5 m. In some embodiments, the length 1310 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 14:
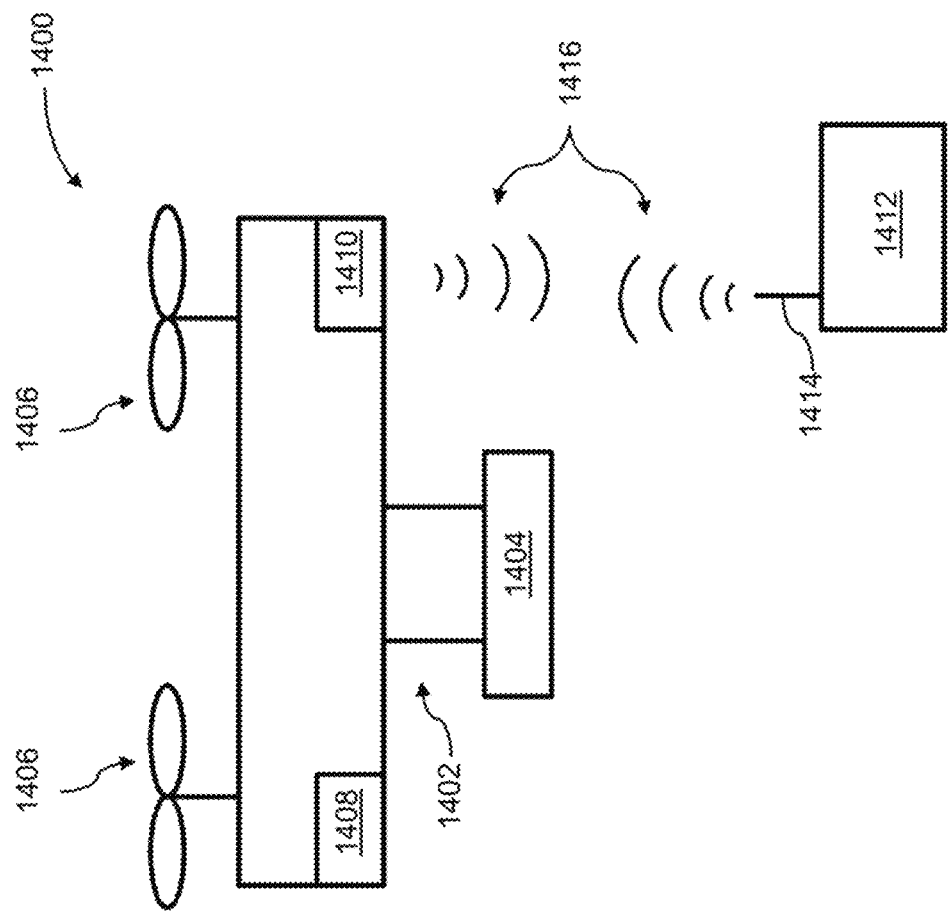
FIG. 14 illustrates a movable object including a carrier and a payload, in accordance with embodiments.

FIG. 14 illustrates a movable object 900 including a carrier 1402 and a payload 1404, in accordance with embodiments. Although the movable object 1400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1404 may be provided on the movable object 1400 without requiring the carrier 1402. The movable object 1400 may include propulsion mechanisms 1406, a sensing system 1408, and a communication system 1410.

The propulsion mechanisms 1406 can include one or more of rotors, propellers, blades, engines, motors, wheels, axles, magnets, or nozzles, as previously described. For example, the propulsion mechanisms 1406 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1406 can be mounted on the movable object 1400 using any suitable means, such as a support element (e.g., a drive shaft) as described elsewhere herein. The propulsion mechanisms 1406 can be mounted on any suitable portion of the movable object 1400, such on the top, bottom, front, back, sides, or suitable combinations thereof.

In some embodiments, the propulsion mechanisms 1406 can enable the movable object 1400 to take off vertically from a surface or land vertically on a surface without requiring any horizontal movement of the movable object 1400 (e.g., without traveling down a runway). Optionally, the propulsion mechanisms 1406 can be operable to permit the movable object 1400 to hover in the air at a specified position and/or orientation. One or more of the propulsion mechanisms 1400 may be controlled independently of the other propulsion mechanisms. Alternatively, the propulsion mechanisms 1400 can be configured to be controlled simultaneously. For example, the movable object 1400 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1400 (e.g., with respect to up to three degrees of translation and up to three degrees of rotation).

The sensing system 1408 can include one or more sensors that may sense the spatial disposition, velocity, and/or acceleration of the movable object 1400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1408 can be used to control the spatial disposition, velocity, and/or orientation of the movable object 1400 (e.g., using a suitable processing unit and/or control module, as described below). Alternatively, the sensing system 1408 can be used to provide data regarding the environment surrounding the movable object, such as weather conditions, proximity to potential obstacles, location of geographical features, location of manmade structures, and the like.

The communication system 1410 enables communication with terminal 1412 having a communication system 1414 via wireless signals 1416. The communication systems 1410, 1414 may include any number of transmitters, receivers, and/or transceivers suitable for wireless communication. The communication may be one-way communication, such that data can be transmitted in only one direction. For example, one-way communication may involve only the movable object 1400 transmitting data to the terminal 1412, or vice-versa. The data may be transmitted from one or more transmitters of the communication system 1410 to one or more receivers of the communication system 1412, or vice-versa. Alternatively, the communication may be two-way communication, such that data can be transmitted in both directions between the movable object 1400 and the terminal 1412. The two-way communication can involve transmitting data from one or more transmitters of the communication system 1410 to one or more receivers of the communication system 1414, and vice-versa.

In some embodiments, the terminal 1412 can provide control data to one or more of the movable object 1400, carrier 1402, and payload 1404 and receive information from one or more of the movable object 1400, carrier 1402, and payload 1404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1406), or a movement of the payload with respect to the movable object (e.g., via control of the carrier 1402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1408 or of the payload 1404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1412 can be configured to control a state of one or more of the movable object 1400, carrier 1402, or payload 1404. Alternatively or in combination, the carrier 1402 and payload 1404 can also each include a communication module configured to communicate with terminal 1412, such that the terminal can communicate with and control each of the movable object 1400, carrier 1402, and payload 1404 independently.

In some embodiments, the movable object 1400 can be configured to communicate with another remote device in addition to the terminal 1412, or instead of the terminal 1412. The terminal 1412 may also be configured to communicate with another remote device as well as the movable object 1400. For example, the movable object 1400 and/or terminal 1412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1400, receive data from the movable object 1400, transmit data to the terminal 1412, and/or receive data from the terminal 1412. Optionally, the remote device can be connected to the Internet or other telecommunications network, such that data received from the movable object 1400 and/or terminal 1412 can be uploaded to a website or server.

The systems, devices, and methods described herein can be applied to a wide variety of movable objects. As previously mentioned, any description herein of a UAV may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object may be a self-propelled unmanned vehicle that does not require human input. In some embodiments, the movable object can be mounted on a living subject, such as a human or an animal. Suitable animals can include avians, canines, felines, equines, bovines, ovines, porcines, delphines, rodents, or insects. In some embodiments, the movable object may be carried.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

Figure 15:
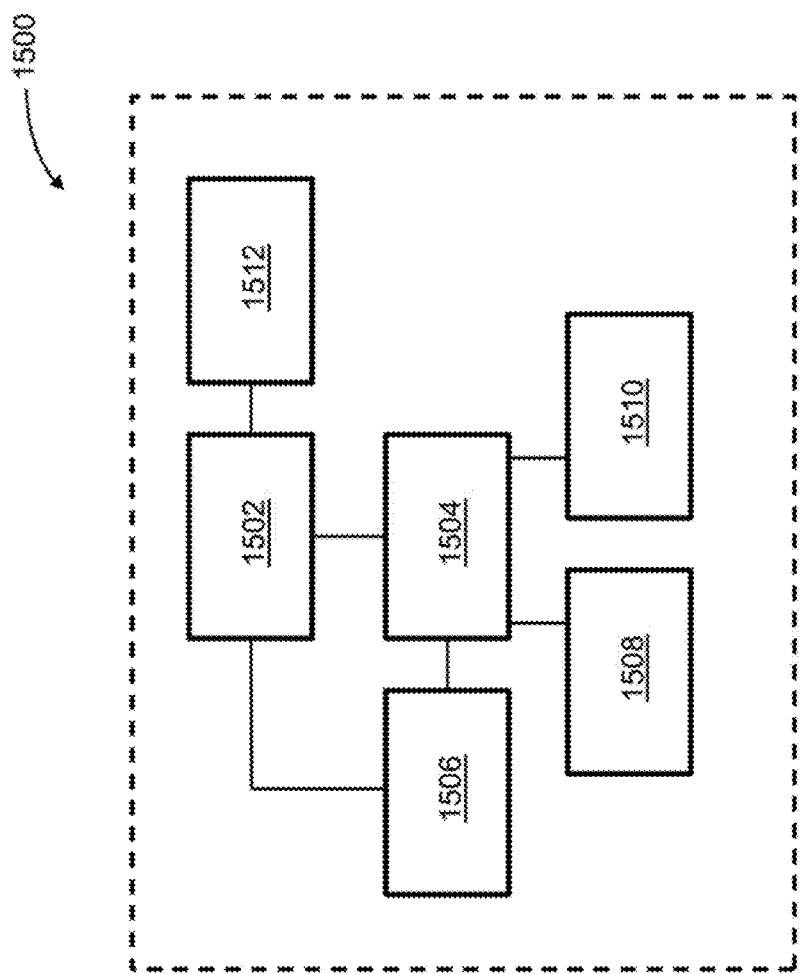
FIG. 15 illustrates a system for controlling a movable object, in accordance with embodiments.

FIG. 15 is a schematic illustration by way of block diagram of a system 1500 for controlling a movable object, in accordance with embodiments. The system 1500 can be used in combination with any suitable embodiment of the systems, devices, and methods disclosed herein. The system 1500 can include a sensing module 1502, processing unit 1504, non-transitory computer readable medium 1506, control module 1508, and communication module 1510.

The sensing module 1502 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1502 can be operatively coupled to a processing unit 1504 having a plurality of processors. In some embodiments, the sensing module can be operatively coupled to a transmission module 1512 (e.g., a Wi-Fi image transmission module) configured to directly transmit sensing data to a suitable external device or system. For example, the transmission module 1512 can be used to transmit images captured by a camera of the sensing module 1502 to a remote terminal.

The processing unit 1504 can have one or more processors, such as a programmable processor (e.g., a central processing unit (CPU)). The processing unit 1504 can be operatively coupled to a non-transitory computer readable medium 1506. The non-transitory computer readable medium 1506 can store logic, code, and/or program instructions executable by the processing unit 1504 for performing one or more steps. The non-transitory computer readable medium can include one or more memory units (e.g., removable media or external storage such as an SD card or random access memory (RAM)). In some embodiments, data from the sensing module 1502 can be directly conveyed to and stored within the memory units of the non-transitory computer readable medium 1506. The memory units of the non-transitory computer readable medium 1506 can store logic, code and/or program instructions executable by the processing unit 1504 to perform any suitable embodiment of the methods described herein. For example, the processing unit 1504 can be configured to execute instructions causing one or more processors of the processing unit 1504 to analyze sensing data produced by the sensing module. The memory units can store sensing data from the sensing module to be processed by the processing unit 1504. In some embodiments, the memory units of the non-transitory computer readable medium 1506 can be used to store the processing results produced by the processing unit 1504.

In some embodiments, the processing unit 1504 can be operatively coupled to a control module 1508 configured to control a state of the movable object. For example, the control module 1508 can be configured to control the propulsion mechanisms of the movable object to adjust the spatial disposition, velocity, and/or acceleration of the movable object with respect to six degrees of freedom. Alternatively or in combination, the control module 1508 can control one or more of a state of a carrier, payload, or sensing module.

The processing unit 1504 can be operatively coupled to a communication module 1510 configured to transmit and/or receive data from one or more external devices (e.g., a terminal, display device, or other remote controller). Any suitable means of communication can be used, such as wired communication or wireless communication. For example, the communication module 1510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1510 can transmit and/or receive one or more of sensing data from the sensing module 1502, processing results produced by the processing unit 1504, predetermined control data, user commands from a terminal or remote controller, and the like.

The components of the system 1500 can be arranged in any suitable configuration. For example, one or more of the components of the system 1500 can be located on the movable object, carrier, payload, terminal, sensing system, or an additional external device in communication with one or more of the above. Additionally, although FIG. 15 depicts a single processing unit 1504 and a single non-transitory computer readable medium 1506, one of skill in the art would appreciate that this is not intended to be limiting, and that the system 1500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1500 can occur at one or more of the aforementioned locations.

As used herein A and/or B encompasses one or more of A or B, and combinations thereof such as A and B.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of determining a flight path for an aerial vehicle, comprising:
   controlling the aerial vehicle to fly along a first route;
   identifying, during the flight along the first route and with aid of one or more processors, a change in a state of signal transmission occurring at a first location, the change of the state of signal transmission indicating an abnormal state in a signal transmission between the aerial vehicle and a control device;
   in response to identifying the change, determining, by the one or more processors, a second location different from the first location;
   determining a second route to the second location;
   controlling, by the one or more processors, the aerial vehicle to fly to and land at the second location; and
   in response to determining that the signal transmission between the aerial vehicle and the control device at the second location is changed from the abnormal state to a normal state, determining a third route, determining the third route including at least one of:
      determining the third route to return to the first route;
      determining the third route to a starting point of the aerial vehicle;
      determining the third route based on a command from a user;
      determining the third route to include a location undetected by a sensor of the aerial vehicle during a previous flight; or
      determining the third route to a service point providing one or more services to restore a normal operational status.

2. The method of claim 1, wherein the abnormal state includes a loss or weakening of a signal during the signal transmission between the aerial vehicle and the control device.

3. The method of claim 1, wherein determining the second route to the second location includes:
   determining the second location from one or more points designated by the user.

4. The method of claim 1, further comprising:
   determining and marking in a map one or more usual landing points.

5. The method of claim 1, wherein the second location includes the service point providing the one or more services to the aerial vehicle, the one or more services including at least one of a part replacement service, a check-up service, a tune-up service, or a repair service.

6. The method of claim 1, wherein in response to determining that the signal transmission between the aerial vehicle and the control device at the second location is changed from the abnormal state to the normal state, determining the third route includes at least one of:
   determining the third route to return to the first route;
   determining the third route to the starting point of the aerial vehicle; or
   determining the third route based on the command from the user.

7. A method of determining a flight path for an aerial vehicle, comprising:
   identifying, during flight and with aid of one or more processors, a change in a state of signal transmission occurring at a first location, the change of the state of signal transmission indicating an abnormal state in a signal transmission between the aerial vehicle and a control device;
   in response to identifying the change, selecting a first destination within a proximity of a second location, wherein a state of signal transmission at the second location during a previous flight is different from the state of signal transmission at the first location;
   determining a first flight path to reach the first destination;
   upon reaching the first destination by the aerial vehicle, assessing in real time the state of signal transmission at the first destination; and
   determining a second flight path to a second destination based on the assessment including:
      in response to the state of the signal transmission at the first destination changing from the abnormal state to a normal state, determining the second flight path including at least one of:
         determining the second flight path to include a location undetected by a sensor of the aerial vehicle during the previous flight;
         determining the second flight path to a predetermined location for the aerial vehicle to reach before identifying the change in the state of signal transmission occurring at the first location;
         determining the second flight path to a starting point of the flight;
         determining the second flight path to a service point providing services to restore a normal operational status; or
         determining the second flight path to a location selected based on a user input at the control device or based on real-time information.

8. The method of claim 7, wherein the change in the state of signal transmission includes a loss or weakening of a signal transmitted between the aerial vehicle and the control device.

9. The method of claim 8, wherein determining the second flight path includes, in response to the signal transmission being lost or weakened at the first destination, including in the second flight path the location undetected by the sensor of the aerial vehicle during the previous flight.

10. The method of claim 8, wherein determining the second flight path includes, in response to the signal transmission being lost or weakened at the first destination, including in the second flight path a location detected by the sensor of the aerial vehicle during the previous flight.

11. The method of claim 7, wherein in response to the state of the signal transmission at the first destination changing from the abnormal state to the normal state, determining the second flight path includes determining the second flight path to include location undetected by the sensor of the aerial vehicle during the previous flight.

12. The method of claim 7, wherein determining the first flight path includes, not including the location undetected by the sensor of the aerial vehicle during the previous flight.

13. The method of claim 7, wherein the first flight path includes a reverse of a last flight path of the aerial vehicle.

14. The method of claim 7, wherein:
the first destination is selected based on at least one of the user input, an operational status of the sensor onboard the aerial vehicle, or a current condition of a flight environment.

15. The method of claim 7, wherein:
the first destination is proximal to the second location with a preset distance; or
the first destination is at the second location.

16. The method of claim 7, wherein:
the second location is a location detected by the sensor onboard the aerial vehicle during the previous flight.

17. The method of claim 7, further comprising, prior to or concurrent with selecting the second destination:
controlling the aerial vehicle to hover for a predetermined period of time to gather data in real time.

18. The method of claim 17, wherein a starting point of the flight is selected as the second destination in response to no user input being received within the predetermined period of time.

19. The method of claim 1, wherein determining the third route further includes, in response to the signal transmission being lost or weakened at the second location, including in the third route the location undetected by the sensor of the aerial vehicle during the previous flight.

20. The method of claim 1, wherein determining the third route further includes, in response to the signal transmission being lost or weakened at the second location, including in the third route a location detected by the sensor of the aerial vehicle during the previous flight.

* * * * *